US011649121B2

(12) United States Patent
Thole et al.

(10) Patent No.: US 11,649,121 B2
(45) Date of Patent: May 16, 2023

(54) SEAL APPARATUS FOR DOCK LEVELERS

(71) Applicant: Rite-Hite Holding Corporation, Milwaukee, WI (US)

(72) Inventors: Collin Thole, Lancaster, WI (US); Timothy J. Schmidt, Dubuque, IA (US); Gary Borgerding, Dubuque, IA (US); Frank Heim, Platteville, WI (US); Mary Blaser, Germantown, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 298 days.

(21) Appl. No.: 16/405,998

(22) Filed: May 7, 2019

(65) Prior Publication Data

US 2019/0337741 A1    Nov. 7, 2019

Related U.S. Application Data

(60) Provisional application No. 62/668,216, filed on May 7, 2018.

(51) Int. Cl.
*B65G 69/00* (2006.01)
*B65G 69/28* (2006.01)

(52) U.S. Cl.
CPC ........ *B65G 69/008* (2013.01); *B65G 69/2811* (2013.01)

(58) Field of Classification Search
CPC ................... B65G 69/008; B65G 69/2811
See application file for complete search history.

(56) References Cited

U.S. PATENT DOCUMENTS

| 588,957 | A | * | 8/1897 | Cowley | A47C 27/05 |
| | | | | | 5/642 |
| 617,273 | A | * | 1/1899 | Bemis | B62M 1/12 |
| | | | | | 280/235 |
| 978,311 | A | * | 12/1910 | Lake | B63B 1/322 |
| | | | | | 114/273 |
| 2,651,398 | A | * | 9/1953 | McGraw | B65G 39/02 |
| | | | | | 193/37 |

(Continued)

FOREIGN PATENT DOCUMENTS

CA        1131857 A        9/1982

OTHER PUBLICATIONS

International Searching Authority, "International Search Report," issued in connection with International Patent Application No. PCT/US2019/031222, dated Sep. 5, 2019, 7 pages.

(Continued)

*Primary Examiner* — Gary S Hartmann
(74) *Attorney, Agent, or Firm* — Hanley, Flight & Zimmerman, LLC

(57) ABSTRACT

Seal apparatus for dock levelers are disclosed. An example loading dock includes a dock leveler movable between a standard loading position, a cross-traffic position and a below-deck loading position. The dock leveler has deck and lip movably coupled to the deck. A seal assembly is coupled to the loading dock adjacent a forward edge of the dock leveler. The seal assembly sealingly engages a front surface of a lip of the dock leveler and a rear surface of the lip when the dock leveler is positioned in a cross-traffic position or a below-dock position.

22 Claims, 32 Drawing Sheets

(56) References Cited

U.S. PATENT DOCUMENTS

| | | | | |
|---|---|---|---|---|
| 3,058,738 A * | 10/1962 | Corson | ..................... | F16F 1/40 267/140 |
| 3,113,546 A * | 12/1963 | Mountcastle | ............. | E02B 3/26 114/219 |
| 3,292,566 A * | 12/1966 | Russell | ..................... | E02B 3/26 114/219 |
| RE27,666 E * | 6/1973 | Dean | ........................ | B63B 59/02 114/219 |
| 3,814,461 A * | 6/1974 | Rhody | .................... | B60R 9/048 410/108 |
| 3,923,221 A * | 12/1975 | Ballinger | .................. | B60R 9/10 224/493 |
| 4,068,877 A * | 1/1978 | Burleson | ................. | B60R 19/16 280/481 |
| 4,682,382 A * | 7/1987 | Bennett | .............. | B65G 69/2876 14/71.3 |
| 4,812,093 A * | 3/1989 | Millar, Jr. | ............. | B60P 7/0807 105/390 |
| 4,850,770 A * | 7/1989 | Millar, Jr. | ............. | B60P 7/0807 410/110 |
| 4,893,576 A * | 1/1990 | Day | ........................ | B63B 59/02 114/219 |
| 5,013,272 A * | 5/1991 | Watkins | .................... | E02B 3/26 441/127 |
| 5,016,554 A * | 5/1991 | Harris, Jr. | .................. | E02B 3/26 114/219 |
| 5,184,857 A * | 2/1993 | Hawkins | ................. | B60R 13/04 114/219 |
| 5,273,473 A * | 12/1993 | Allen | ........................ | B63B 7/06 114/219 |
| 5,366,264 A * | 11/1994 | Guay | ........................ | B60P 3/12 293/125 |
| 5,658,633 A * | 8/1997 | Di Biase | ................... | F16F 7/00 428/68 |
| 5,676,508 A * | 10/1997 | Weicht | ................... | B60P 7/0807 114/218 |
| 6,654,976 B2 * | 12/2003 | Digmann | .............. | B65G 69/008 14/69.5 |
| 6,739,563 B1 * | 5/2004 | Wallace | ................... | A47F 10/02 248/345.1 |
| 6,883,198 B2 * | 4/2005 | Alexander | ........... | B65G 69/001 14/71.5 |
| 7,444,785 B2 * | 11/2008 | Dillon | .................. | B65G 69/001 14/71.1 |
| 7,513,210 B1 * | 4/2009 | Salit | ........................ | B63B 7/082 114/219 |
| 8,057,142 B1 * | 11/2011 | Alamillo | ............... | B60P 7/0807 410/101 |
| 8,181,759 B2 * | 5/2012 | Schmidt | ................ | F16F 13/007 188/371 |
| 9,073,710 B1 * | 7/2015 | Eungard | ............ | B65G 69/2805 |
| 9,783,378 B2 * | 10/2017 | Ogg | ...................... | B65G 69/008 |
| 2003/0005530 A1 | 1/2003 | Digmann et al. | | |
| 2005/0053427 A1 | 3/2005 | Dillon et al. | | |
| 2005/0166488 A1 * | 8/2005 | Borgerding | .......... | B65G 69/008 52/173.2 |
| 2011/0061184 A1 | 3/2011 | Kimener et al. | | |
| 2013/0167310 A1 | 7/2013 | Eungard | | |
| 2016/0229647 A1 | 8/2016 | Kowk | | |
| 2017/0113225 A1 * | 4/2017 | Howell | .................... | B01L 9/06 |
| 2017/0238943 A1 * | 8/2017 | Sennett | ............. | A61B 17/1671 |
| 2017/0254134 A1 * | 9/2017 | Ben-Arie | .............. | E05F 15/686 |

OTHER PUBLICATIONS

International Searching Authority, "Written Opinion," issued in connection with International Patent Application No. PCT/US2019/031222, dated Sep. 5, 2019, 9 pages.

International Bureau, "International Preliminary Report on Patentability," issued in connection with International Patent Application No. PCT/US2019/031222, dated Nov. 19, 2020, 9 pages.

IP Australian Government: "Examination Report No. 1 for Standard Patent Application", issued in connection with Australian Patent Application No. 2019265554 dated Jul. 27, 2021, 8 pages.

China National Intellectual Property Administration, "Office Action," issued in connection with Chinese Patent Application No. 201980045466.4 dated Nov. 9, 2021, 18 pages including partial English translation).

Canadian Intellectual Property Office, Office Action, issued in connection with Canadian Patent Application No. 3,111,839 dated Jan. 20, 2022, 3 pages.

China National Intellectual Property Administration, "Notice of Granting Patent Right for Invention and Completing Formalities for Patent Registration", issued in connection with Chinese Patent Application No. 201980045466.4 dated Jul. 5, 2022, 8 pages.

IP Australia, "Notice of Acceptance for Patent Application", issued in connection with Australian Patent Application No. 2019265554 dated Apr. 29, 2022, 3 pages.

Canadian Intellectual Property Office, "Office Action", issued in connection with Canadian Patent Application No. 3,111,839 dated Oct. 19, 2022, 3 pages.

* cited by examiner

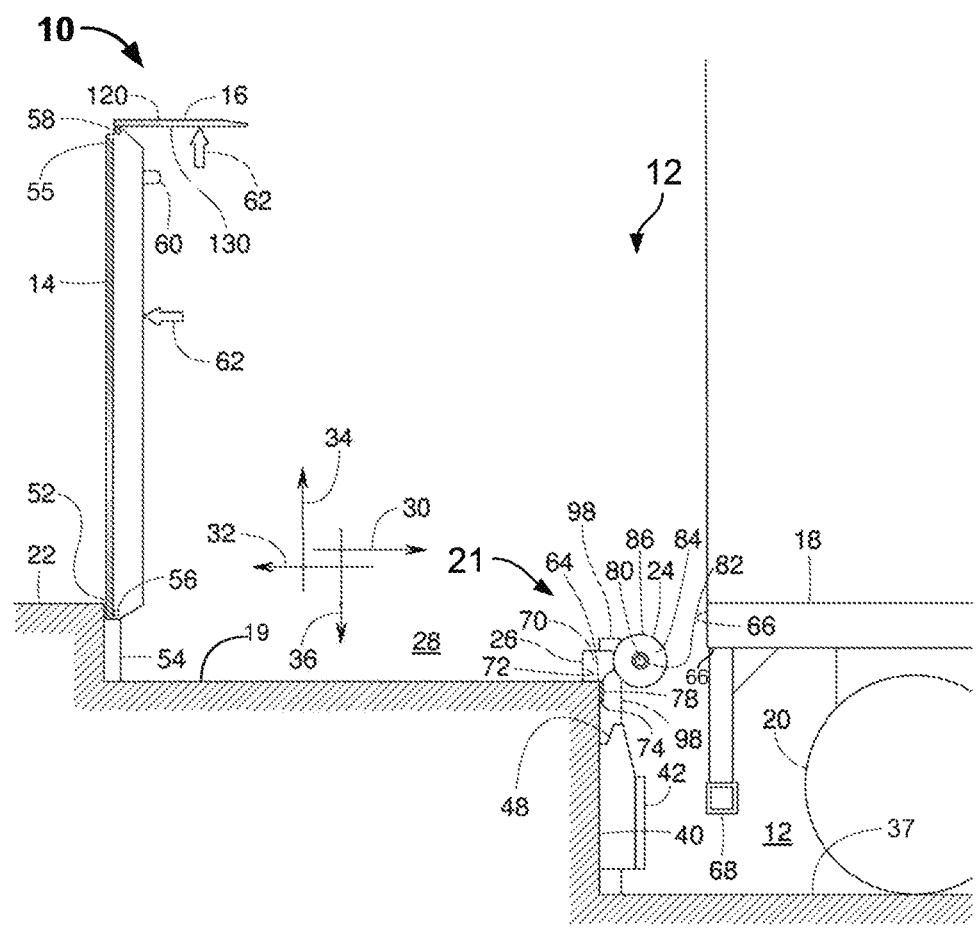
FIG. 4
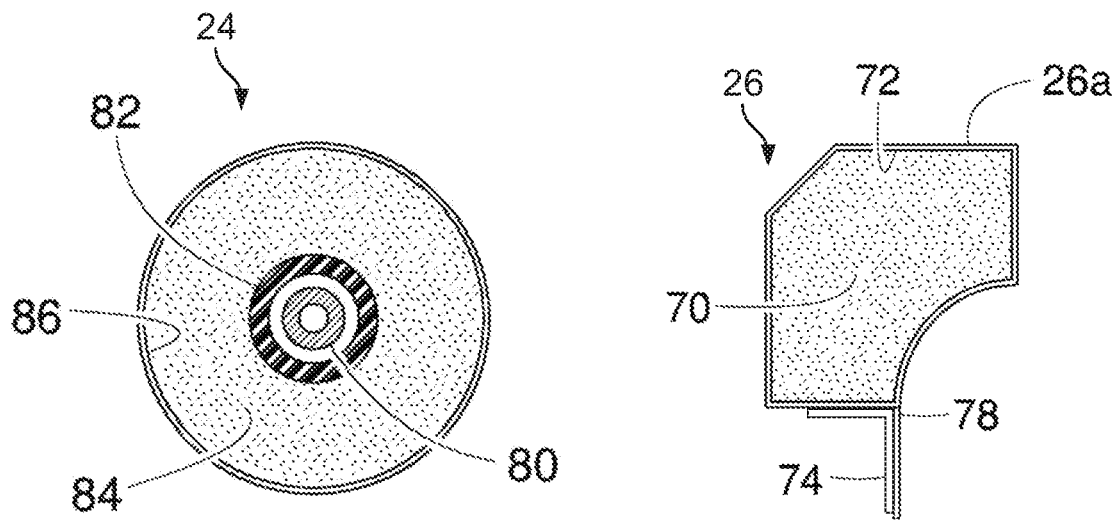
FIG. 5
FIG. 6

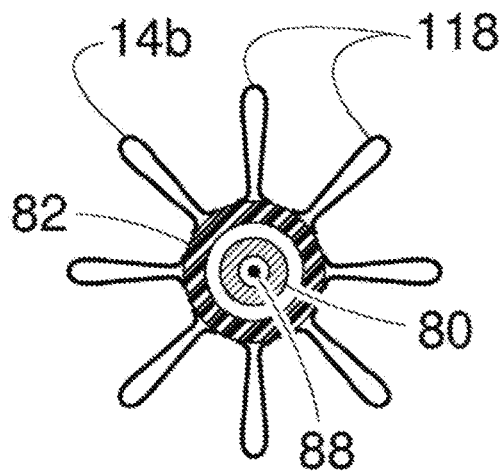 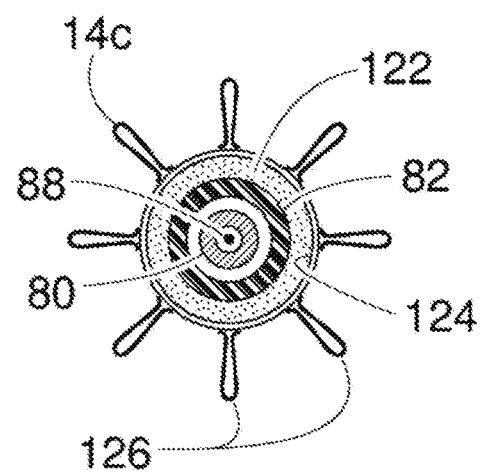
FIG. 40A  FIG. 40B
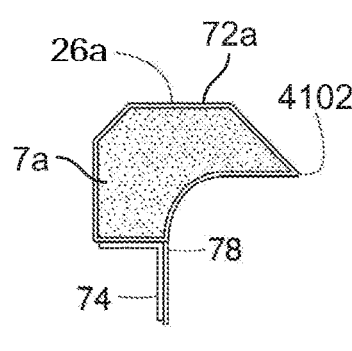 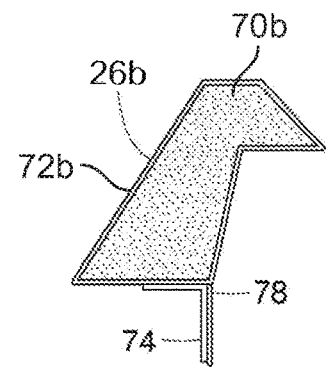
FIG. 41A  FIG. 41B
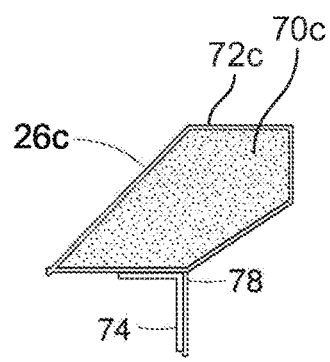 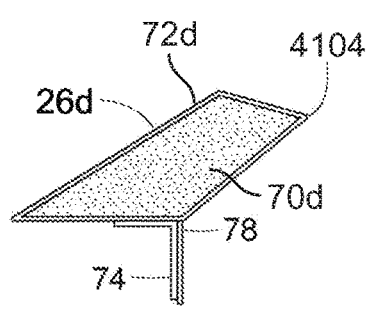 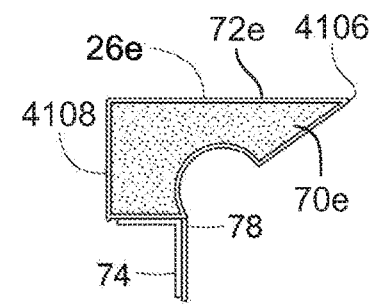
FIG. 41C  FIG. 41D  FIG. 41E

SEAL APPARATUS FOR DOCK LEVELERS

RELATED APPLICATION

This patent claims the benefit of U.S. Provisional Patent Application Ser. No. 62/668,216, filed on May 7, 2018, which is hereby incorporated herein by reference in its entirety.

FIELD OF THE DISCLOSURE

This disclosure relates generally to dock levelers and, more particularly, to seal apparatus for dock levelers.

BACKGROUND

A loading dock of a building includes an exterior doorway with an elevated loading dock platform for loading and/or unloading vehicles, such as trucks and trailers positioned adjacent the doorway. To compensate for a height difference between the loading dock platform and an adjacent cargo bed of a vehicle (e.g., a truck or a trailer), many loading docks have a dock leveler. Dock levelers include a deck or ramp pivotally hinged along a back edge to vary a height of a front edge relative to the cargo bed of the vehicle. To span a gap between the front edge of the deck and the rear of the vehicle's cargo bed, the dock lever includes an extension plate or lip that extends outward from the front edge of the deck.

The deck and lip are moveable between a stored position and various operative positions. In the stored position, the deck may be either vertical or horizontal, depending on the style of dock leveler. The lip can extend from the front edge of the deck to rest upon the cargo bed of the vehicle to provide a bridge between the deck and the cargo bed to enable personnel and material handling equipment to readily move on and off the vehicle during loading and/or unloading operations.

To help shield against weather while a vehicle is being serviced at the dock, seals can be installed around a perimeter of a doorway. These seals can be mounted along upper and side edges of the doorway to help close air gaps between a face of a building and a rear of the vehicle.

BRIEF DESCRIPTION OF THE DRAWINGS

FIG. 4 is a cross-sectional side view of the example loading dock of FIG. 2 showing an example dock leveler in an example stored position.

FIG. 5 is a cross-sectional view of an example front seal of the example seal apparatus of FIG. 2.

FIG. 6 is a cross-sectional view of an example rear seal of the example seal apparatus of FIG. 2.

FIGS. 40A and 40B are cross-sectional views of example front seals disclosed herein that can be used to implement example seal apparatus disclosed herein.

FIGS. 41a-41e are cross-sectional views of example rear seals disclosed herein that can be used to implement example seal apparatus disclosed herein.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Figure 1A:
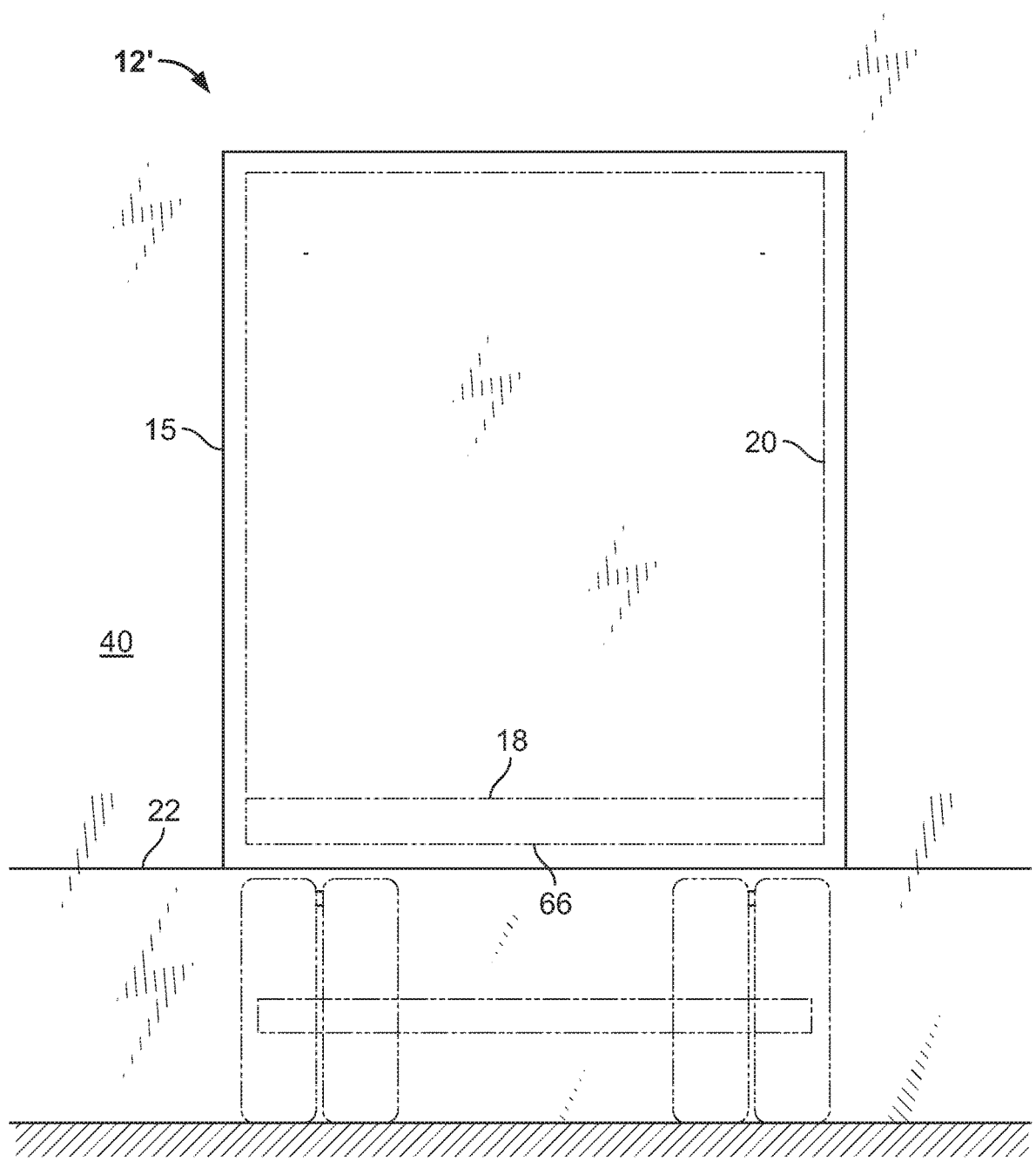
FIG. 1A is a front view of a conventional loading dock with an example vehicle shown in phantom lines.
Figure 1B:
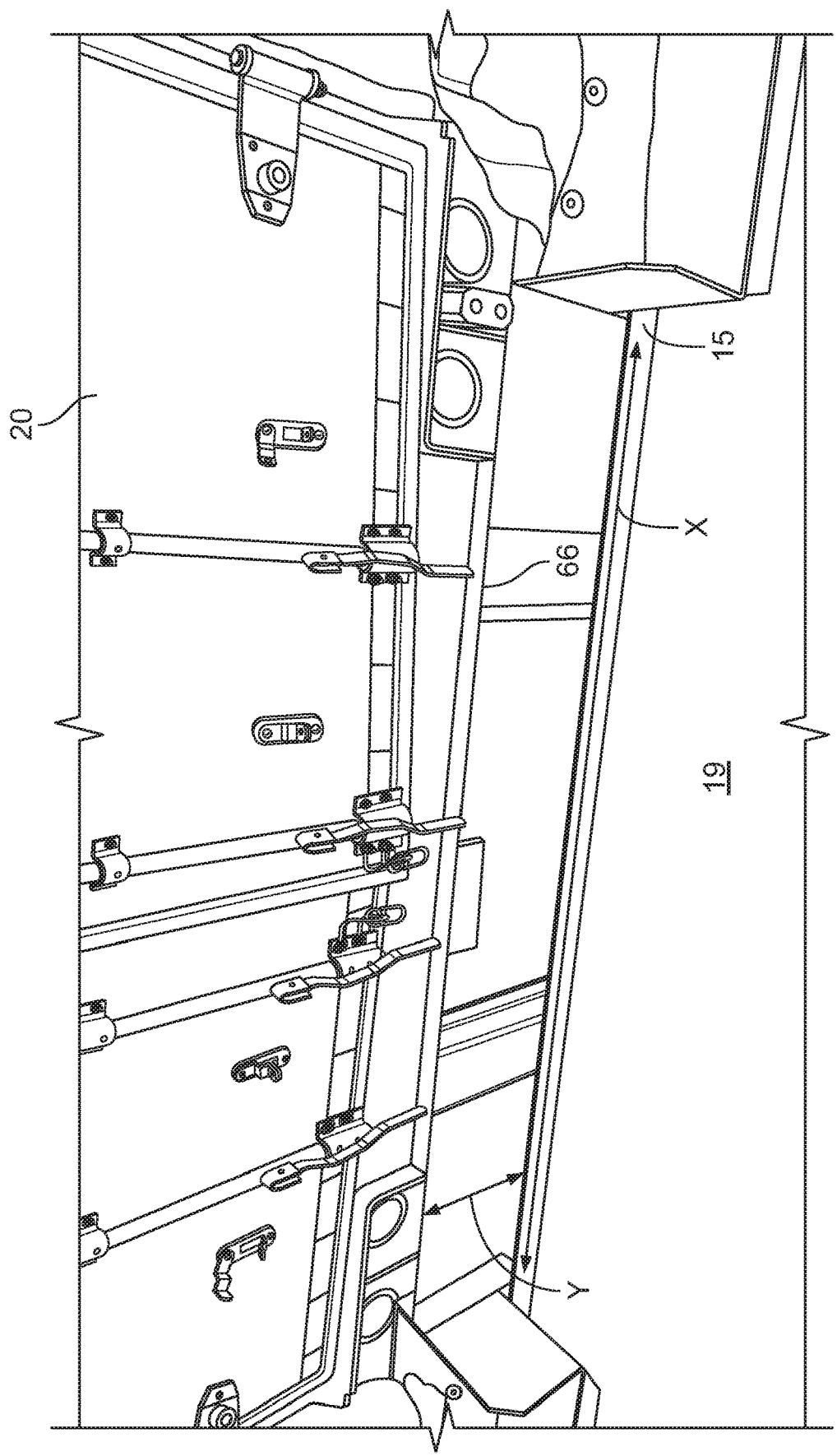
FIG. 1B is a perspective view of the loading dock of FIG. 1 from a view point of an interior of the loading dock toward a rear end of the example vehicle of FIG. 1A.
Figure 1C:
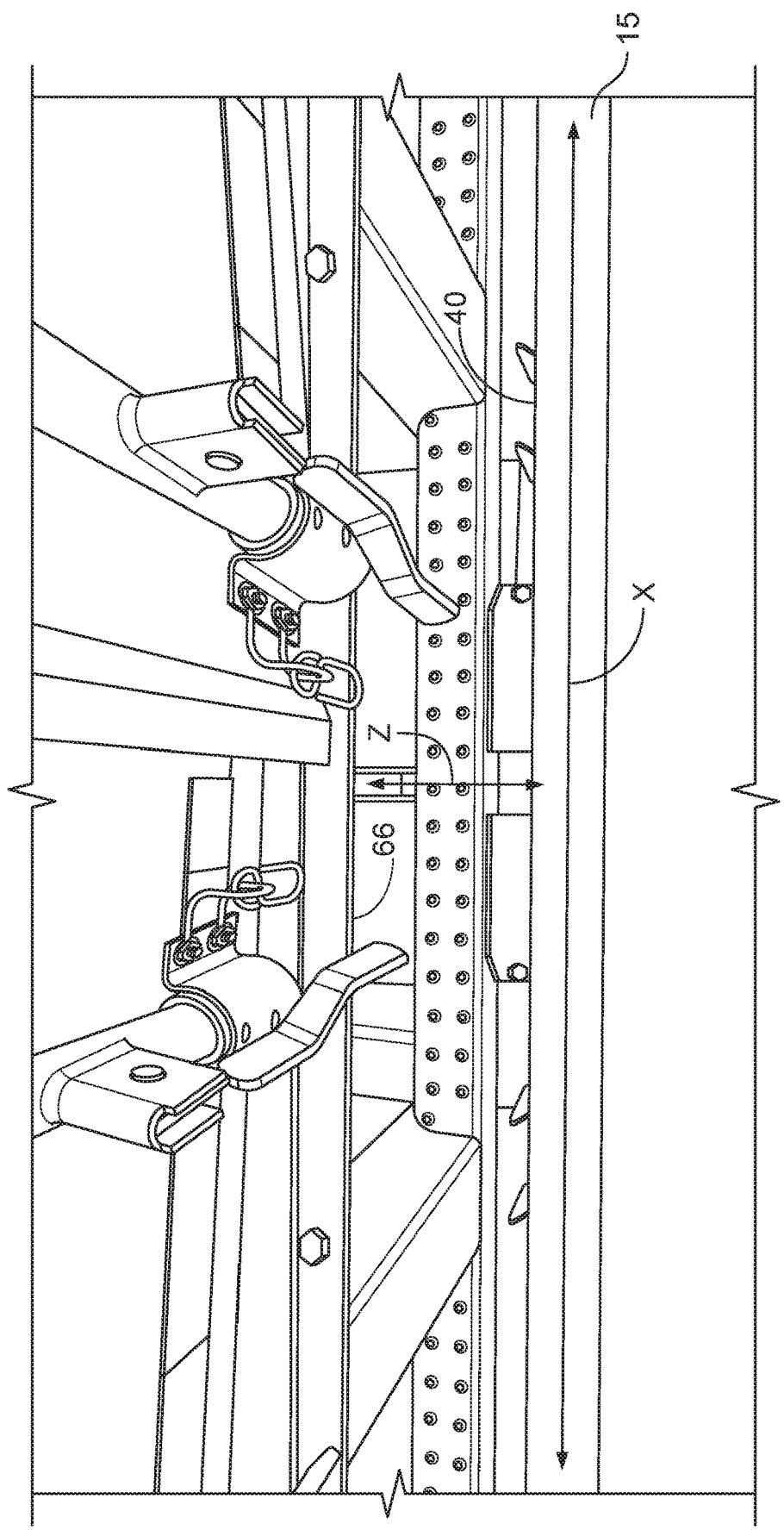
FIG. 1C is another perspective view of the loading dock of FIGS. 1A and 1B.

FIG. 1A is a front view of a known loading dock 12'. FIG. 1B is a perspective view of the loading dock 12' of FIG. 1A showing a rear of a vehicle 20 positioned at the loading dock 12'. FIG. 1C is another perspective view of the loading dock 12' of FIG. 1A showing the rear of the vehicle 20. Referring to FIGS. 1A-1C, the loading dock 12' of the illustrated example includes a dock leveler to bridge a gap between a platform 22 of the loading dock 12' and a vehicle cargo bed 18 of the vehicle 20. When the vehicle 20 is positioned adjacent a doorway 15, a first gap Y (e.g., a gap in an x-y plane in the orientation of FIG. 1B) forms along a width of an opening of the doorway 15 (e.g., in an x-direction) and between a pit floor 19 of the loading dock 12' and a bottom surface of the rear edge 66 of the vehicle 20 (y-direction). Additionally, a second gap Z (in a x-z plane in the orientation of FIG. 1C) forms along the width of the opening of the doorway 15 (in the x-direction) and between a dock face 40 and the rear edge 66 of the trailer (z-direction). In some instances, a third gap forms at a hinge gap between a deck and a lip of a dock leveler. During a loading and unloading operation, unwanted environmental elements (e.g., cold air, debris, etc.) can pass through the first gap Y, the second gap Z, and/or the third gap.

Example seal apparatus disclosed herein seal (e.g., close or reduce) airgaps at a loading dock. In some examples, seal apparatus disclosed herein can seal an airgap (e.g., a first airgap) formed between a vehicle and a dock face of a loading dock when a vehicle is parked at the loading dock, an airgap (e.g., a second airgap) formed between an outer surface of a lip of a leveler and the vehicle (e.g., when the lip is in a stored position or an end-loading configuration), and/or an airgap (e.g., a third airgap) formed between a hinge pivotally coupling the lip and the deck. For example, seals disclosed herein can seal the first gap Y and/or the second gap Z of FIGS. 1B and 1C. Therefore, example seal apparatus disclosed herein prevent or restrict environmental elements (e.g., snow, cold air, debris accumulation, etc.) from entering an interior of a building during a loading and/or unloading operation and/or a pit area of a dock leveler to maintain the pit area relatively clear of obstructions for sanitary and operational purposes.

Further, example seal apparatus disclosed herein do not interfere with an operation of a dock leveler or other dock equipment and do not interfere with a cleaning operation of a pit area. In some examples, seal apparatus disclosed herein enable resilient movement and/or compressibility to withstand impact and friction during loading and/or unloading operations. In some examples, seal apparatus disclosed herein employ a single seal (e.g., a front seal or a rear seal) to provide a seal. In some examples, seal apparatus disclosed herein employ a plurality of seals (e.g., a front seal and a rear seal) to provide a seal.

Figure 2:
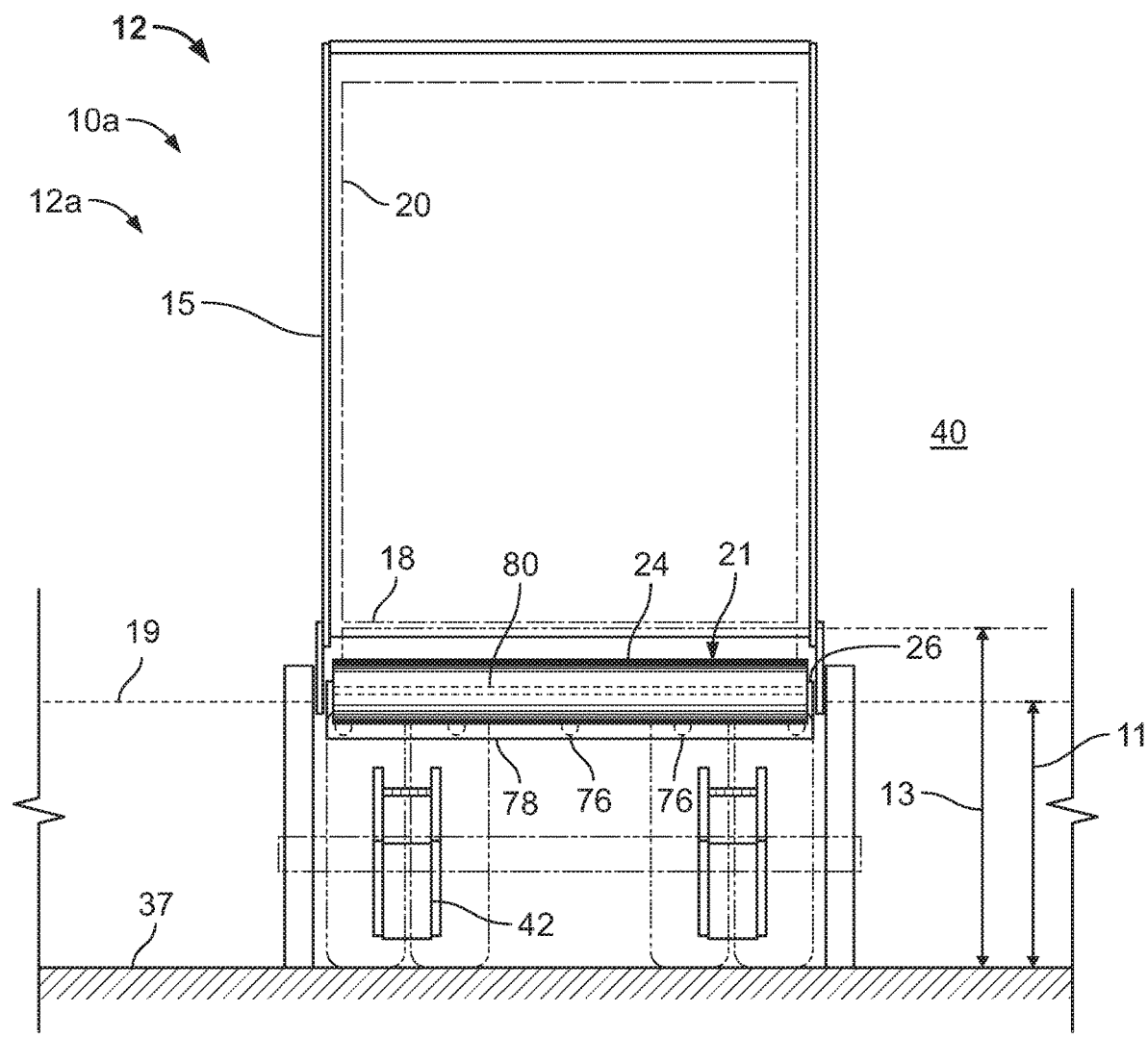
FIG. 2 is a front view of an example loading dock implemented with an example seal apparatus constructed in accordance with teachings of this of this disclosure.
Figure 3:
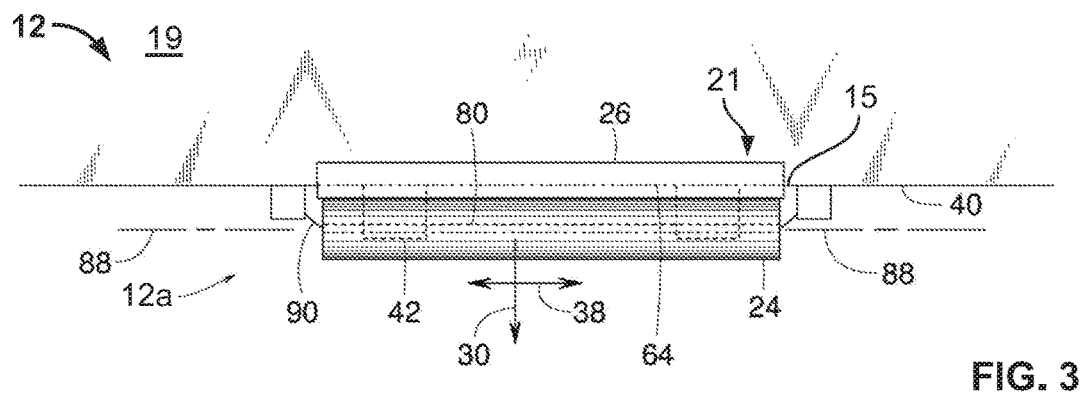
FIG. 3 is a top view of FIG. 1.

FIG. 2 illustrates an example loading dock 12 implemented with an example seal apparatus 21 (e.g., a seal assembly) constructed in accordance with teachings of this disclosure. FIG. 3 is a top view of the loading dock 12 of FIG. 2. FIG. 4 is a side view of the loading dock 12 of FIG. 2. FIGS. 2-4 illustrate a loading bay 12a of the loading dock 12. In some examples, the loading dock 12 can include a plurality of loading bays positioned adjacent the loading bay 12a.

For spatial reference, arrow 30 represents a forward direction, arrow 32 represents a rearward direction, arrow 34 represents an upward direction, and arrow 36 represents a downward direction. In FIG. 3, arrow 38 represents a horizontal direction that is perpendicular to forward direction 30.

Referring to FIGS. 2-4, the loading dock 12 of the illustrated example includes a dock face 40 (e.g., a building wall) defining a doorway 15 facing in the forward direction 30 and a driveway 37 to enable the vehicle 20 to access the doorway 15 of the loading dock 12. In some examples, the dock face 40 of the illustrated example includes a bumper 42 to absorb an impact between the vehicle 20 and the dock face 40. In some examples, the loading dock 12 includes other equipment including a vehicle restraint (e.g., a wheel chock, a rear impact guard barrier, a hook, etc.) to inhibit the vehicle 20 from prematurely departing the loading dock 12.

To transfer cargo between a platform 22 (e.g., an interior of a building) and a vehicle cargo bed 18, the loading dock 12 of the illustrated example includes the dock leveler 10. The dock leveler 10 of the illustrated example is a vertically-stored leveler. For example, a deck 14 of the dock leveler 10 is in a generally vertical position (e.g., in an x-y plane) when the deck 14 is in an example stored position of FIGS. 2-4. The dock leveler 10 includes the deck 14 and a lip 16 that together provide an articulated adjustable ramp or bridge to transfer goods between the vehicle cargo bed 18 of the vehicle 20 (e.g., truck, trailer, etc.) and a platform 22 of the loading dock 12. The platform 22 of the illustrated example is at an elevation 11 from the driveway 37 that is lower than an elevation 13 between a rear edge 66 of the vehicle 20 and the driveway 37. As used herein, the rear edge 66 of a vehicle 20 includes a lower most edge of a trailer of the vehicle 20. For example, the lower most edge can include a portion of a surface of a rear (e.g., defined by the rear edge 66) of the trailer or vehicle 20 that is oriented toward the dock face 40 and/or a portion of a surface of the rear (e.g., defined by the rear edge 66) of the trailer or vehicle 20 that is oriented toward the driveway 37. In some examples, examples seal apparatus disclosed herein engage or seal against at least the surface of the vehicle 20 defined by the rear edge 66 that is oriented toward the dock face 40 or the surface of the vehicle 20 defined by the rear edge 66 that is oriented toward the driveway 37.

The loading dock 12 of the illustrated example includes a pit 28 recessed relative to the platform 22 to provide an area (e.g., avoid) to enable the deck 14 to pivot between a fully raised position and various lower or operational positions (e.g., a cross-traffic position, a below-dock position, etc.) relative to the vehicle 20 (e.g., the vehicle cargo bed 18) during loading and/or unloading operations. In some such example, the pit 28 can form a continuous area (e.g., without separating walls or structures) between the loading bay 12a and a plurality of adjacent loading bays of the loading dock 12. For example, the pit 28 extends or connects to a pit of an adjacent loading dock bay. A continuous area forming the pit 28 facilitates cleaning operations of the pit 28 (e.g., for sanitary applications). For example, when the dock leveler 10 is in a stored position, the pit 28 is generally open and readily accessible for cleaning.

Referring to FIG. 4, the dock leveler 10 is in an example stored position. In the stored position, the deck 14 is at a raised position (e.g., a fully raised position) and the lip 16 is at a retracted position (e.g., a fully retracted position). To enable the deck 14 to pivot relative to the platform 22, the dock leveler 10 is pivotally coupled to a frame 54 that is positioned (e.g., anchored) in the pit 28. To pivotally couple the deck 14 to the frame 54, a rear edge 52 of deck 14 is coupled to the frame 54 via a rear hinge 56. To pivotally couple the lip 16 and the deck 14, the lip 16 is coupled to a front edge 55 of the deck 14 via a front hinge 58. The front hinge 58 at the front edge 55 of the deck 14 and the rear hinge 56 at the rear edge 52 of the deck 14 enable the dock leveler 10 to adjust or compensate for a height differential between the platform 22 and the vehicle cargo bed 18. To move the deck 14 and/or the lip 16 between the stored position of FIG. 4 and various lowered positions (e.g., of FIGS. 8-10), the dock leveler 10 employs one or more actuators 62 (e.g., hydraulic cylinders, linear motors, mechanical linkages, inflatable bladders, springs, and combinations thereof, etc.).

To seal one or more gaps (e.g., the first gap Y of FIG. 1B, the second gap Z of FIG. 1C, etc.) that may otherwise form between the loading dock 12 (e.g., the lip 16) and the vehicle 20 and/or the dock face 40 and the vehicle 20, the loading dock 12 of the illustrated example includes the seal apparatus 21. The seal apparatus 21 of the illustrated example includes a first or front seal 24 and a second or rear seal 26. In some examples, the front seal 24 and/or the rear seal 26 engage the rear edge 66 such that at least a portion of the front seal 24 and/or the rear seal 26 engage at least a portion of a surface of the vehicle 20 adjacent the rear edge 66 that is oriented toward the dock face 40 or a portion of a surface of the vehicle 20 adjacent the rear edge 66 that is oriented toward the driveway 37.

FIG. 5 is a cross-sectional view of the front seal 24. Referring to FIGS. 2-5, the front seal 24 is horizontally elongate to define a longitudinal axis 88. The front seal 24 includes an axle 80, an outer tube 82, a resiliently compressible foam member 84 (e.g., polyurethane foam), and a flexible cover 86 (e.g., fabric, vinyl, etc.). The axle 80 is a relatively stiff metal tube (e.g., a pipe). The outer tube 82 is radially supported by the axle 80 and can rotate relative to the axle 80 about the longitudinal axis 88 (e.g., a center of rotation). In some examples, the outer tube 82 is made of polyvinyl chloride (e.g., PVC Pipe).

FIG. 6 is a cross-sectional view of the rear seal 26 of FIGS. 2-5. The rear seal 26 of the illustrated example includes a compressible core 70 (e.g., a compressible foam core, a polyurethane foam) encased or covered within the cover 72 (e.g., a flexible protective cover, vinyl, etc.). To couple the rear seal 26 to the dock face 40 to facilitate access to the pit 28 (e.g., to clean to pit 28), the rear seal 26 is removably coupled to the dock face 40. To removably couple the rear seal 26 to the dock face 40, the rear seal 26 includes a fastener 74. The fastener 74 of the illustrated example is a tool-free fastener. The term, "tool-free fastener" refers to any connector that can be readily disconnected and reconnected manually without the need for tools. For example, the fastener 74 of the illustrated example includes a plurality of disc magnets 76. The disc magnets 76 are coupled to a strip of material 78 extending from the cover 72 (e.g., a protective cover or fabric) of the rear seal 26. Other example fasteners (e.g., tool-free fasteners) to removably couple the rear seal 26 to the dock face 40 include, but are not limited to, snap connectors, VELCRO (registered trademark of Velcro Companies, of United Kingdom), hook-and-loop fasteners, magnets, etc. In some examples, the rear seal 26 can couple to another structure (e.g., stationary structure) of the loading dock 12 and/or the dock leveler 10 (e.g., the frame 54).

Figure 7:
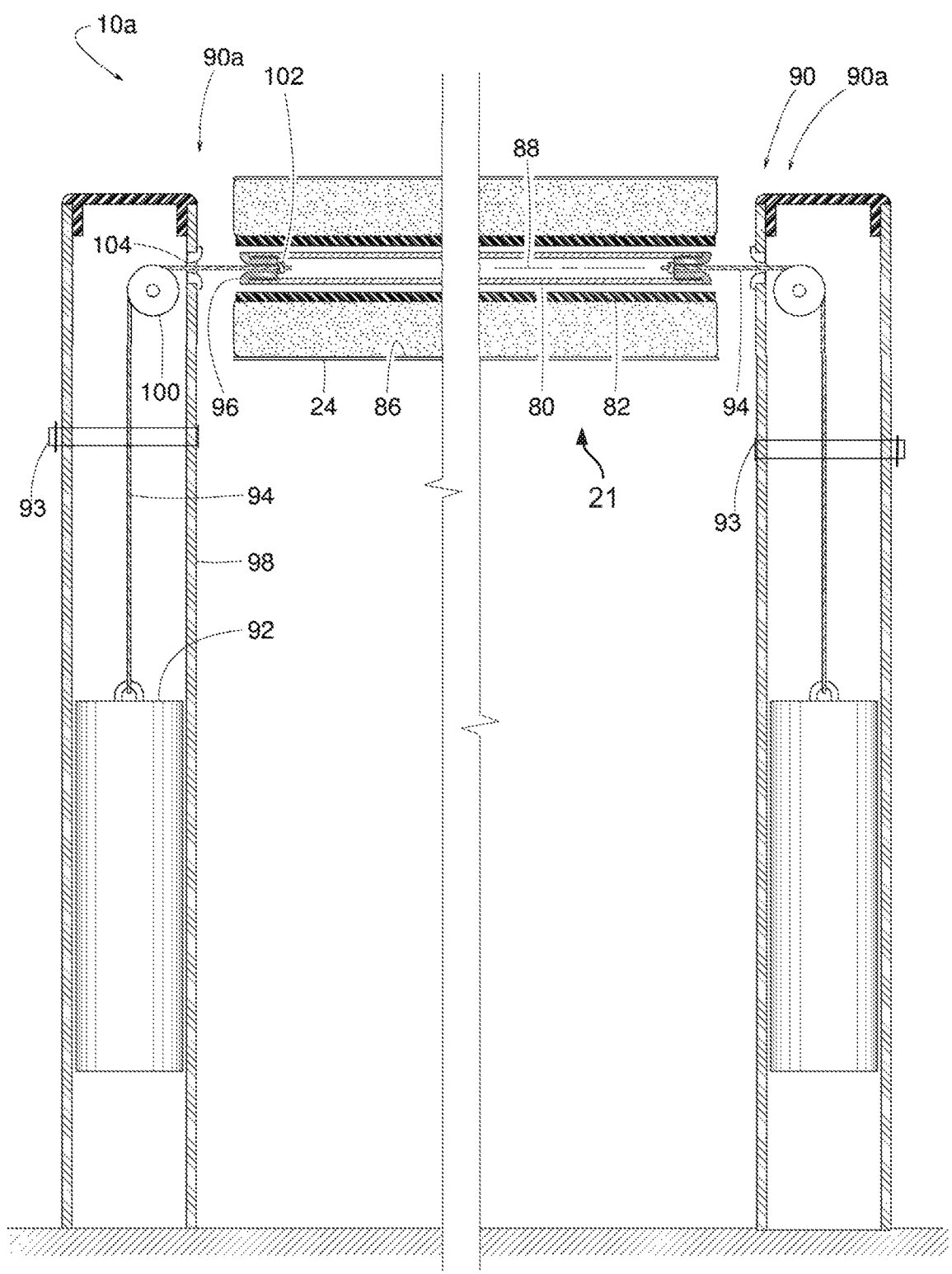
FIG. 7 is a cross-sectional view of an example front seal and an example seal mounting system of the example seal apparatus of FIG. 2.

FIG. 7 is a cross-sectional view of a mounting system 90a of the seal apparatus 21. To maintain the front seal 24 adjacent the rear seal 26, the seal assembly 200 of the illustrated example includes the mounting system 90a. For example, the mounting system 90a maintains the front seal 24 at approximately a same elevation as the rear seal 26 when the lip 16 and/or the vehicle 20 is not in engagement with the front seal 24 and the rear seal 26. Additionally, the mounting system 90a enables the front seal 24 to move (e.g., in the forward direction 30, the rearward direction 32, the upward direction 34, the downward direction 36 and/or the lateral direction 38).

The mounting system 90a of the illustrated example includes a counterweight 92 (e.g., a metal bar or rod) and a cable 94 (e.g., a cord, a rope, a strap, a chain, a cable, etc.). For example, the counterweight 92 can be an anchor that couples the cable 94 to the loading dock 12. The mounting system 90a of the illustrated example includes a connector 96, a tube 98 (e.g., a substantially vertical tube), and a pulley 100. The connector 96 connects one end of the cable 94 to the axle 80. The connector 96 of the illustrated example is a bushing with external threads to threadably couple to internal threads of the axle 80. The connector 96 can be composed of aluminum, plastic, and/or any other suitable material(s). In some examples, the connector 96 can be a non-threaded connector, a snap-fit connector, a clip, and/or any other connector to couple the axle 80. The cable 94 includes a knot at one end that engages the connector 96 to retain the cable 94 coupled to the connector 96. The cable 94 feeds through an opening 104 in the tube 98, engages (e.g., passes over) the pulley 100, and extends down to suspend the counterweight 92 within a cavity of the tube 98. Although the counterweight 92 biases the front seal 24 to maintain a position of the front seal 24 adjacent the rear seal 26, the counterweight 92 permits the displacement of the front seal 24 relative to the rear seal 26 and/or the dock face 40 without causing damage to the front seal 24 (e.g., in a resilient, non-damaging manner). The counterweight 92 is suspended in the cavity of the tube 98 via the cable 94 is slidably movable within the cavity of the tube 98.

The mounting system 90a includes a pin 93 extending through the tube 98 to fix (e.g., a position of) the counterweight 92 within the tube 98 during, for example, operation, servicing and/or shipping, etc. During operation, the pin 93 restricts a range of motion of the counterweight 92 in a longitudinal direction (e.g., the upward direction 34, the downward direction 36, or a vertical direction in the orientation of FIG. 4). In some examples, the pin 93 restricts movement of the counterweight 92 in the longitudinal direction (e.g., restrictions movement of the counterweight 92 toward the pulley 100) and prevents the counterweight 92 from (e.g., directly) engaging, impacting or contacting the pulley 100. For adjustment, servicing, and/or installation, the pin 93 can be moved or removed so the counterweight 92 can be accessed and/or removed from the tube 98. During shipping, the pin 93 can secure the counterweight 92 within the tube 98 (e.g., restricting or preventing movement of the counterweight 92 in the upward direction 34 and/or the downward direction 36). In the shipping position, the pin 93 can pass through an opening (e.g., an eyelet or hook) of the counterweight 92. In some examples when the pin 93 is in a shipping position, the pin 93 prevents movement of the counterweight 92 in the upward direction 34 and the downward direction 36. In other words, the pin 93 fixes a position of the counterweight 92 relative to the tube 98 such that the counterweight 92 cannot move relative to the tube 98 and/or the pin 93. In some examples, at least one other pin or similar feature can be used to guide the movement or limit a range of motion of the counterweight 92 within the tube 98.

Figure 8:
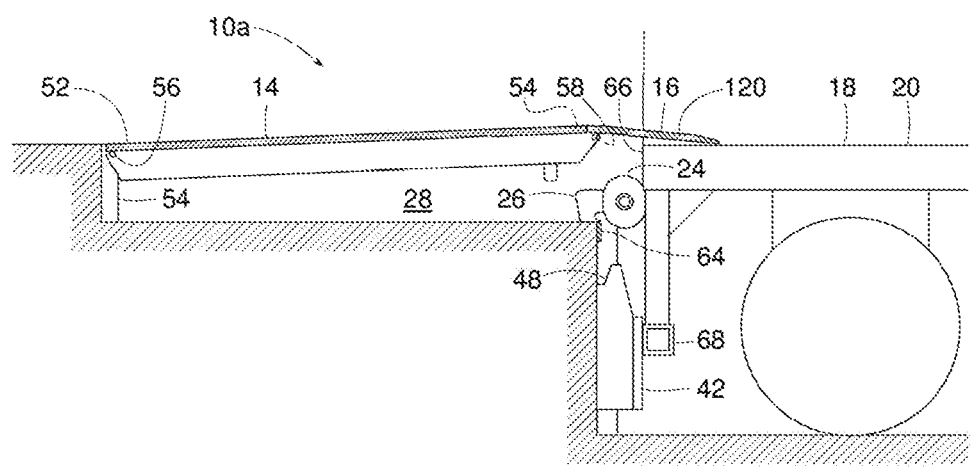
FIG. 8 is a side view similar to FIG. 4 but showing the example dock leveler in an example standard loading position.
Figure 9:
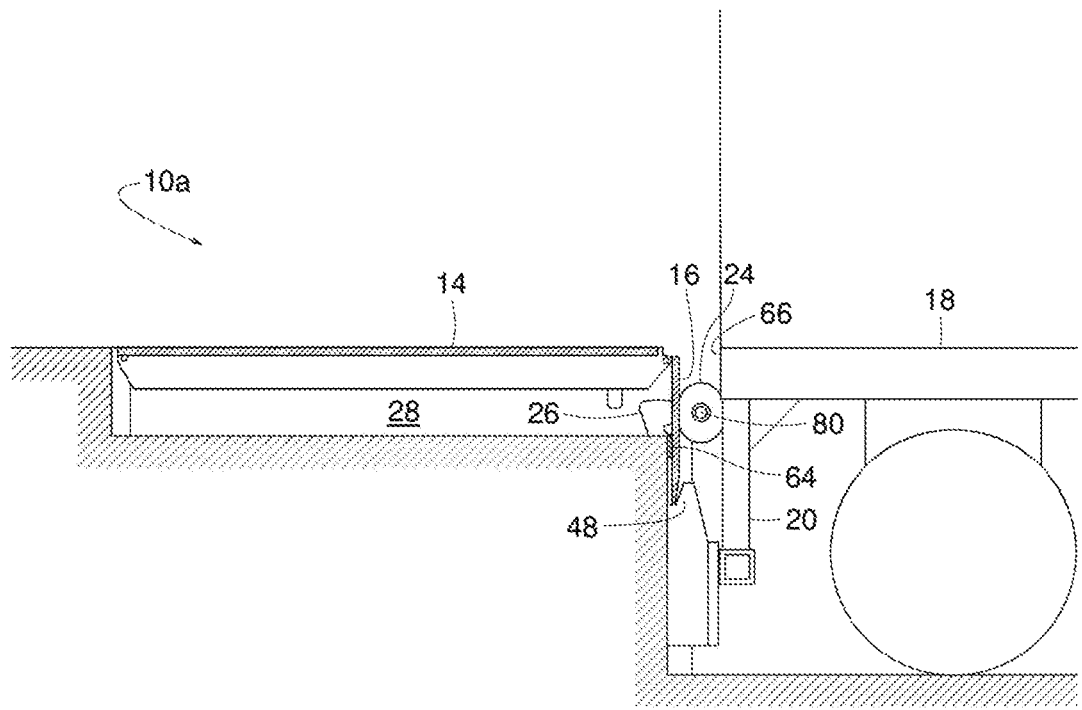
FIG. 9 is a side view similar to FIG. 4 but showing the example dock leveler at an example cross-traffic position.
Figure 10:
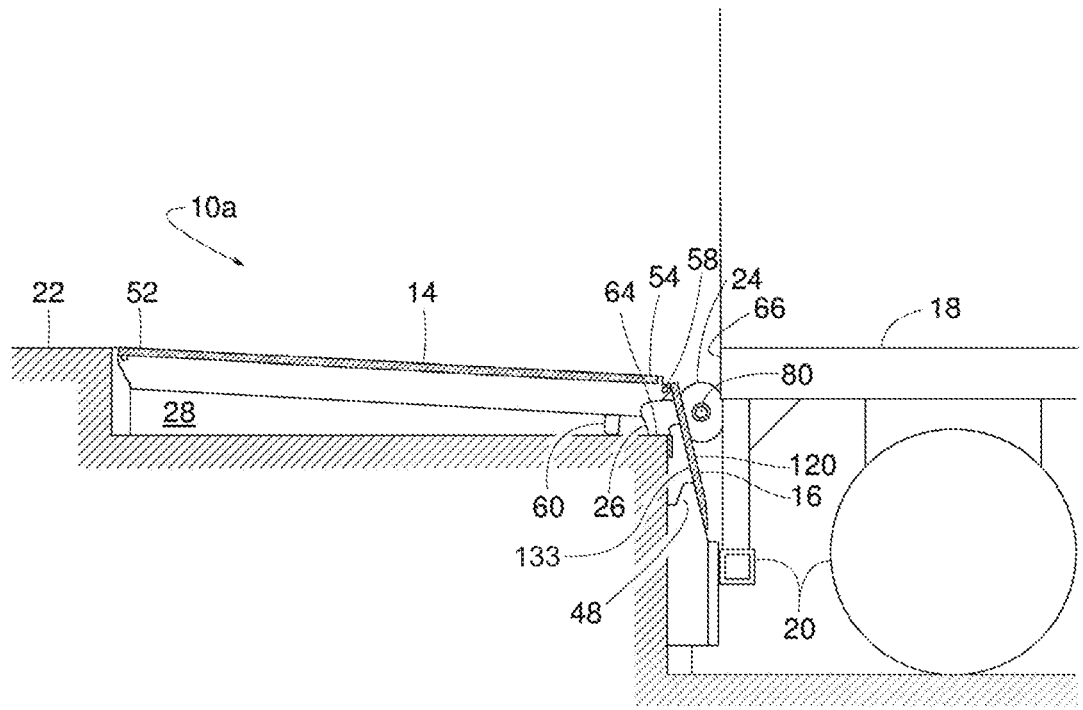
FIG. 10 is a side view similar to FIG. 4 but showing the example dock leveler at an example below-dock position.

During loading and/or unloading operations, the dock leveler 10 can be positioned at various positions relative to the vehicle cargo bed 18. For example, FIG. 8 illustrates the dock leveler 10 at an example standard loading position. FIG. 9 illustrates the dock leveler 10 at an example cross-traffic position (e.g., a substantially horizontal position). FIG. 10 illustrates the dock leveler 10 at a below-dock position (e.g., a fully lowered position). For example, to employ the dock leveler 10 for vehicle-end loading and/or vehicle-end unloading operations, the deck 14 can be positioned to the cross-traffic position of FIG. 9 and the below-dock position of FIG. 10.

When the deck 14 and the lip 16 are in the positions shown in FIGS. 8-10 during loading and/or unloading operations, the seal apparatus 21 of the illustrated example seals (e.g., closes or obstructs) air gaps that can otherwise form between the dock face 40 and the rear edge 66 of the vehicle 20. For example, the front seal 24 and/or the rear seal 26 shelter the pit 28 from environmental elements (e.g., outdoor weather, snow, rain, etc.) and/or debris by blocking an air gap that might otherwise exist between a front edge 64 of the pit 28 and the rear edge 66 of the vehicle 20.

For example, FIG. 8 illustrates the dock leveler 10 in a standard loading position. In the standard position, the deck 14 is in a lowered position and the lip 16 is in an extended position (e.g., a fully extended position) and at least partially positioned on the vehicle cargo bed 18. Specifically, FIG. 8 shows a rear impact guard 68 of the vehicle 20 in engagement with a bumper 42 of the dock face 40. To move the dock leveler 10 to the standard loading position, one or more actuators 62 move the lip 16 to an extended position (e.g., a fully extended position) and lower the deck 14 until the lip 16 rests on the vehicle cargo bed 18. With the dock leveler 10 positioned in the standard loading position, cargo can be transferred between the platform 22 and the vehicle cargo bed 18 via the dock leveler 10.

In the standard position, the front seal 24 and the rear seal 26 are positioned beneath or below the deck 14 and the lip 16. Additionally, the front seal 24 engages the rear seal 26 and the rear edge 66 of the vehicle 20 to close an air gap that would otherwise exist between the rear edge 66 of the vehicle 20 and a front edge 64 of the pit 28 and/or the dock face 40. The front seal 24 and the rear seal 26 of the illustrated example are horizontally elongate and extend substantially a full width of the deck 14 and the lip 16. In some examples, the front seal 24 and/or the rear seal 26 extend a distance that is less than a full width of the deck 14 or extend a distance that is greater than a full width of the deck 14.

FIG. 9 illustrates the dock leveler 10 in a cross-traffic position. As the deck 14 lowers from the stored position of FIG. 4 to the cross-traffic position of FIG. 9, the lip 16 is in a retracted position and engages the seal apparatus 21 (e.g., is positioned between the front seal 24 and the rear seal 26). To enable the lip 16 to be positioned between the front seal 24 and the rear seal 26 without causing damage to the rear seal 26 and/or the front seal 24 as the lip 16 engages the front seal 24 and the rear seal 26, the mounting system 90a enables the front seal 24 to shifts (e.g., in the forward direction 30, the rearward direction 32, the upward direction 34, the downward direction 36 and/or the lateral direction 38) relative to the dock face 40 and/or the rear seal 26. For example, the counterweight 92 slides within the tube 98 (e.g., in the upward direction 34) to enable the front seal 24 to move in a direction away from the dock face 40. Additionally, the rear seal 26 can compress or deflect relative to the dock face 40 and/or the front seal 24. Thus, the front seal 24 can separate or shift relative to the rear seal 26 to allow the lip 16 to be positioned between the front seal 24 and the rear seal 26. The mounting system 90a, via the counterweight 92, biases the front seal 24 into sealing engagement with the lip 16. To receive and/or support the lip 16 when the lip 16 is in the cross-traffic position of FIG. 9, the loading dock 12 of the illustrated example includes one or more lip keepers 48. The bumpers 42 and the lip keepers 48 of the illustrated example are combined as a unit and are mounted relatively low so that bumpers 42 engage a rear impact guard 68 of the vehicle 20.

In the cross-traffic position of FIG. 9, the deck 14 is substantially parallel relative to the vehicle cargo bed 18. Additionally, the lip 16 is in a retracted position (e.g., a fully retracted or stored position). For example, the lip 16 is positioned substantially perpendicular relative to the deck 14. As used herein, substantially parallel means perfectly parallel or approximately parallel (e.g., within 10 degrees or 10 percent of perfectly parallel). As used herein, substantially perpendicular means perfectly perpendicular or approximately perpendicular (e.g., within 10 degrees or 10 percent of perfectly perpendicular).

Specifically, the lip 16 is positioned (e.g., sealingly pressed) between the rear seal 26 and the front seal 24. For example, the rear seal 26 sealingly engages a rear surface of the lip 16 and the front seal sealingly engages a front surface of the lip 16. In the illustrated example, the front seal 24, the lip 16 and/or the rear seal 26 closes a gap between the rear edge 66 of the vehicle 20 and the front edge 64 of the pit 28. For example, the front seal 24 and the rear seal 26 close, block or reduce a gap between a front surface of the lip 16 and the rear edge 66 of the vehicle 20.

FIG. 10 illustrates the dock leveler 10 in the below-dock position (e.g., a fully lowered position). In the below-dock position, the deck 14 is positioned at an angle (e.g., a downward sloping angle toward the vehicle 20) and the lip 16 is positioned between the front seal 24 and the rear seal 26 at a partially extended or retracted position. In the fully lowered position, deck 14 slopes downward from its rear edge 52 to its front edge 55. When deck 14 is at the fully lowered position and the lip 16 is the partially extended position as shown in FIG. 10, the lip 16 is positioned in front of the lip keepers 48. The dock leveler 10 of the illustrated example includes a stop block 60 to support the deck 14 when the deck is in a fully lowered position as shown, for example, in FIG. 10. In the illustrated example, the front seal 24, the lip 16 and/or the rear seal 26 closes a gap between the rear edge 66 of the vehicle 20 and the front edge 64 of the pit 28. For example, the front seal 24 closes, blocks or reduces a gap between a front surface of the lip 16 and the rear edge 66 of the vehicle 20 and the rear seal 26 closes, blocks or reduces a gap formed by the front hinge 58 between the deck 14 and the lip 16.

An end-loading operation as shown in FIGS. 9 and 10 can be employed during loading and/or unloading operation when a floor space of the vehicle cargo bed 18 is inadequate to receive the lip 16 (e.g., when there is no available floor space to rest the lip 16 on the vehicle cargo bed 18). For example, this instance can arise when a load of cargo is adjacent or near the rear edge 66 (e.g., the very back end) of the vehicle 20. In these instances, the lip 16 cannot be positioned on the vehicle cargo bed 18 and is positioned in a retracted position (e.g., the fully retracted position of FIG. 9 or the partially retracted position of FIG. 10) based on a height of vehicle cargo bed 18 relative to the platform 22. If an elevation of the vehicle cargo bed 18 is equal to or higher than the platform 22, then deck 14 can be placed at the cross-section position (FIG. 9) with the lip 16 resting on the lip keepers 48. If the vehicle cargo bed 18 is at an elevation that is lower than the platform 22, then the deck 14 is lowered or angled down to the fully lowered position (FIG. 10) and the lip 16 is in a partially extended position in front of the lip keepers 48.

After a loading and/or unloading operation is complete, the dock leveler 10 is positioned to the stored position of FIG. 4 (e.g., a fully raised position). When the deck 14 rises from the cross-traffic position of FIG. 9 or the below-dock position of FIG. 10, the lip 16 moves upwardly (e.g., in the upward direction 34) and away (e.g., out) from between the front seal 24 and the rear seal 26. As the lip 16 rises (e.g., in the upward direction 34), the lip 16 moves (e.g., pushes) the front seal 24 relative to the rear seal 26 (e.g., in the forward direction 30 and/or the upward direction 34). To prevent damage to the front seal 24, the axle 80 is configured to allow to the front seal 24 to rotate about the longitudinal axis 88 when the lip 16 moves from between the front seal 24 and the rear seal 26. In addition, the mounting system 90a allows displacement of the front seal 24 (e.g., in vertical displacement and/or horizontal displacement) relative to the rear seal 26 and/or the dock face 40 as the lip 16 and the deck 14 move to the stored position. Thus, the mounting system 90a enables the front seal 24 to move in the forward direction 30, the rearward direction 32, the upward direction 34, the downward direction 36, the lateral direction 38 and/or a combination thereof.

FIGS. 11-36 illustrate other example loading docks 1100, 1400, 1700, 3100 implemented with other example seal apparatus 1102, 1402, 1702, 3002 disclosed herein. Those components of the loading docks 1100, 1400, 1700, 3000 and/or the seal apparatus 1102, 1402, 1702, 3002 of FIGS. 11-36 that are substantially similar or identical to the components of the loading dock 12 and/or the seal apparatus 21 described above and that have functions substantially similar or identical to the functions of those components will not be described in detail again below. Instead, the interested reader is referred to the above corresponding descriptions. To facilitate this process, similar reference numbers will be used for like structures.

Figure 11:
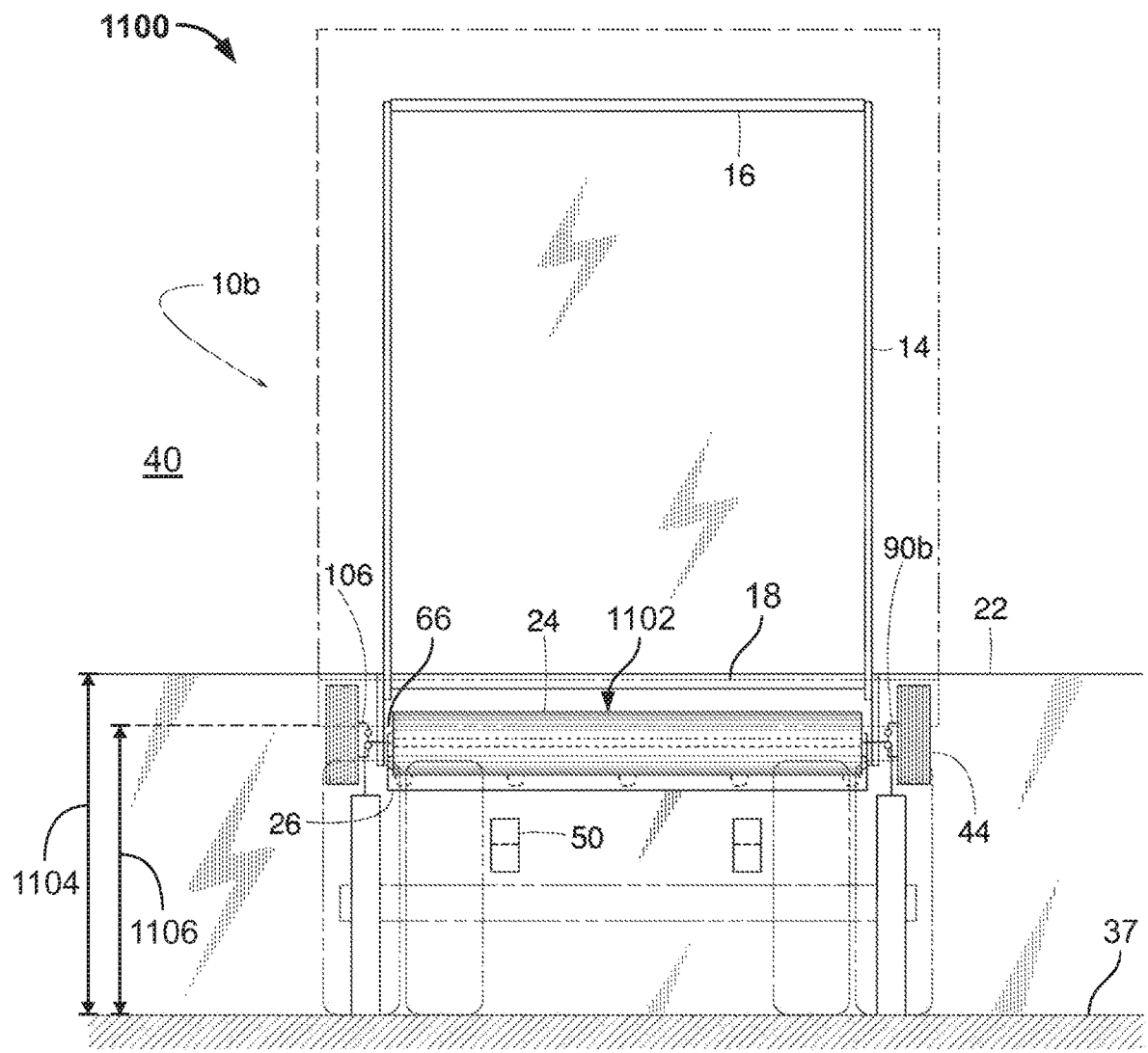
FIG. 11 is a front view of an example loading dock having another example seal apparatus disclosed herein.
Figure 12:
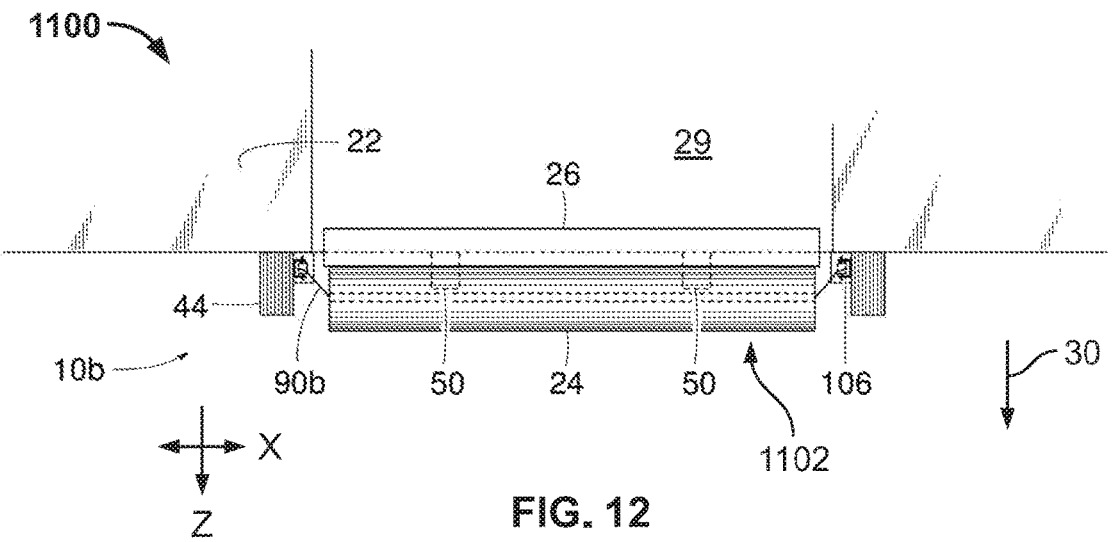
FIG. 12 is a top view of FIG. 11.
Figure 13:
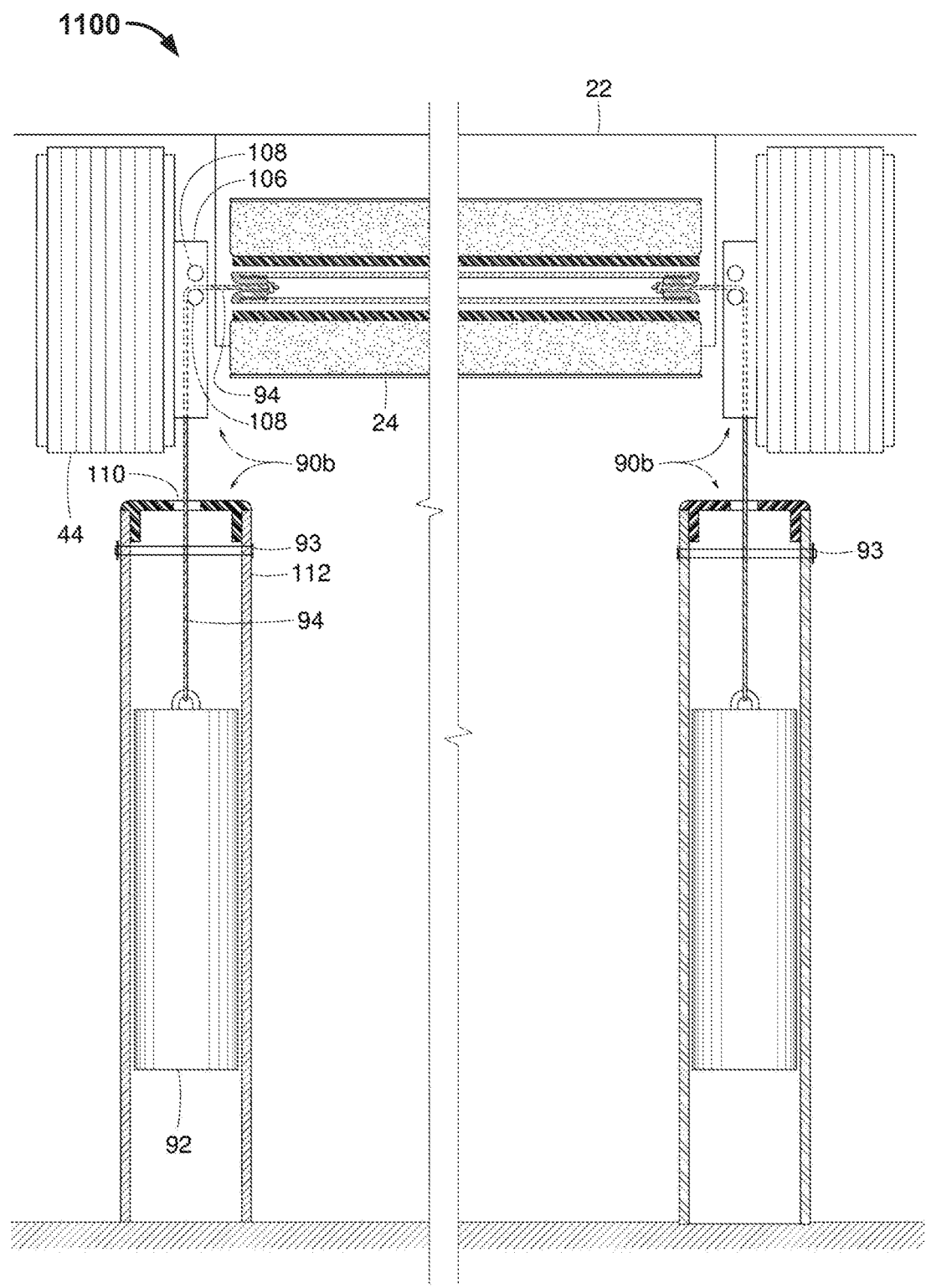
FIG. 13 is a cross-sectional view of an example front seal and an example mounting system of the example seal apparatus of FIG. 11.

FIG. 11 is a front view of another example loading dock 1100 implemented with another example seal apparatus 1102 disclosed herein. FIG. 12 is a top view of the example loading dock 1100 of FIG. 11. FIG. 13 is a cross-sectional view of a mounting system 90b of the seal apparatus 1102.

The loading dock 1100 of the illustrated example includes a dock face 40 (e.g., a building wall) facing in the forward direction 30 and a driveway 37. In some examples, the dock face 40 of the illustrated example includes bumpers 44 to absorb an impact between the vehicle 20 and the dock face 40. To transfer cargo between a platform 22 (e.g., an interior of a building) and a vehicle cargo bed 18, the loading dock 12 of the illustrated example includes the dock leveler 10b. The dock leveler 10b of the illustrated example is a pit-style leveler. In a pit-style leveler configuration, a pit 29 is formed (e.g. recessed) in the platform 22 and is recessed relative to the platform 22 to receive the dock leveler. In contrast to the dock leveler 10b (e.g., the vertical-style leveler) of FIGS. 2-10, the pit 29 of the pit-style leveler configuration is not continuous relative to adjacent loading dock bays. In other words, the platform 22 is positioned on either side of the pit 29 and does not extend or connect to a pit of an adjacent loading dock bay. In some instances, the dock leveler 10b (e.g., the pit-style leveler) is a horizontally-stored leveler. For example, a deck 14 of the pit-style leveler is generally in a horizontal position stores (e.g., an x-z plane) when the deck 14 of the pit-style leveler is in a stored position. Additionally, an elevation 1104 between the driveway 37 and the platform 22 is greater than an elevation 1106 between the driveway 37 and a rear edge 66 of a vehicle 20.

To provide a seal between the vehicle 20 and the loading dock 1100 due to the height variation between the platform 22 and the vehicle cargo bed 18, the loading dock 1100 includes a seal apparatus 1102. The seal apparatus 1102 of FIG. 11 is substantially similar to the seal apparatus 21 of FIGS. 2-10. For example, the seal apparatus 1102 includes a front seal 24 and a rear seal 26.

The seal apparatus 1102 has a mounting system 90b that is different than the mounting system 90a of the seal apparatus 21 of FIGS. 2-10. The mounting system 90b of the illustrated example includes bumpers 44 that are mounted at a higher elevation and structured to receive the rear edge 66 of the vehicle 20. The bumpers 44 are spaced or separated from lip keepers 50 and positioned at a higher elevation compared to the lip keepers 50. The mounting system 90b of the illustrated example includes a bracket 106 with feed rollers 108 that guide a cable 94 (e.g., downwardly) through an opening 110 to suspend a counterweight 92 within a tube 112 (e.g., a vertical or substantially vertical tube). The structure and function of the mounting system 90a and the mounting system 90b are otherwise the same.

Figure 14:
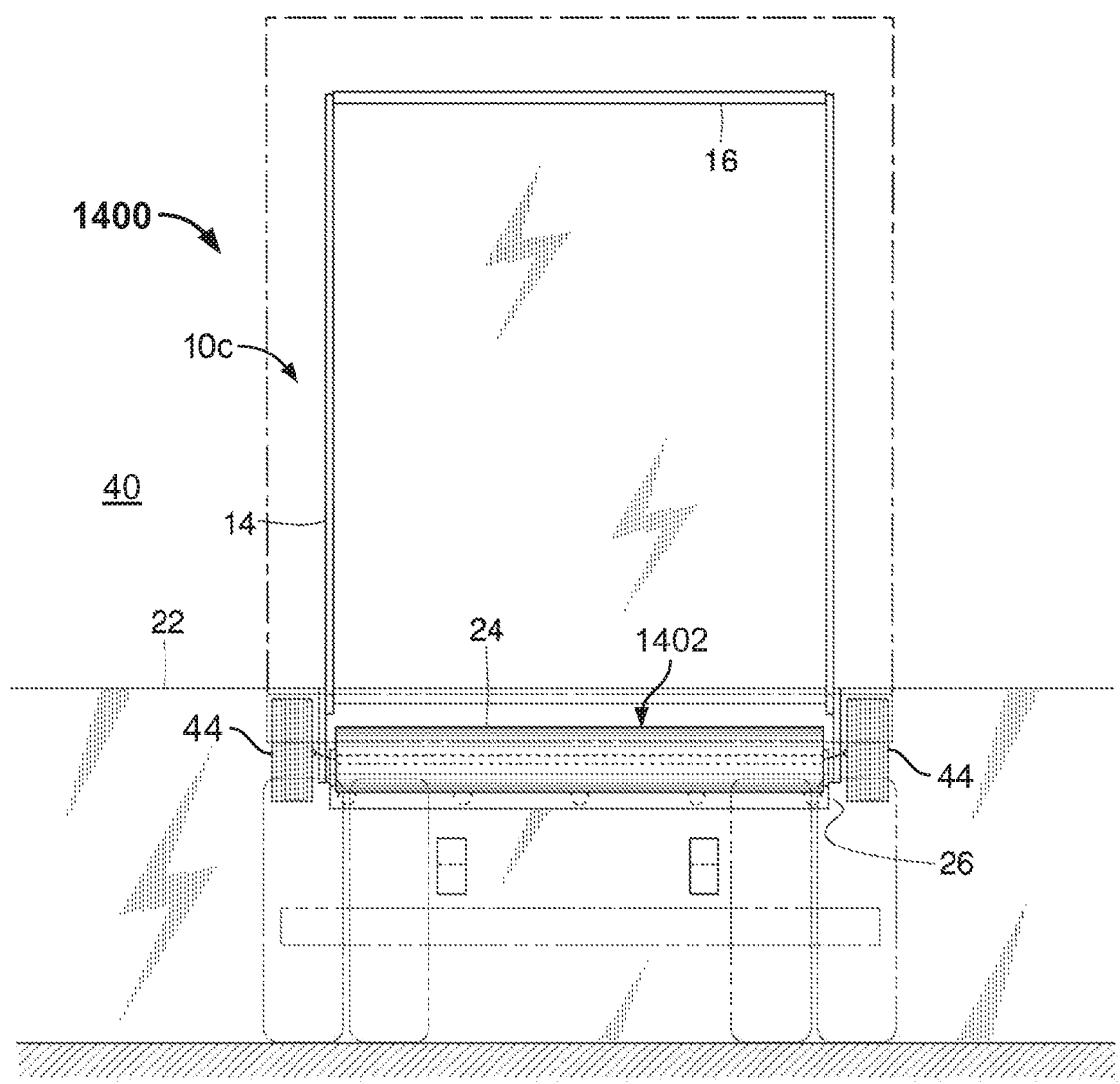
FIG. 14 is a front view of an example loading dock having another example seal apparatus disclosed herein.
Figure 15:
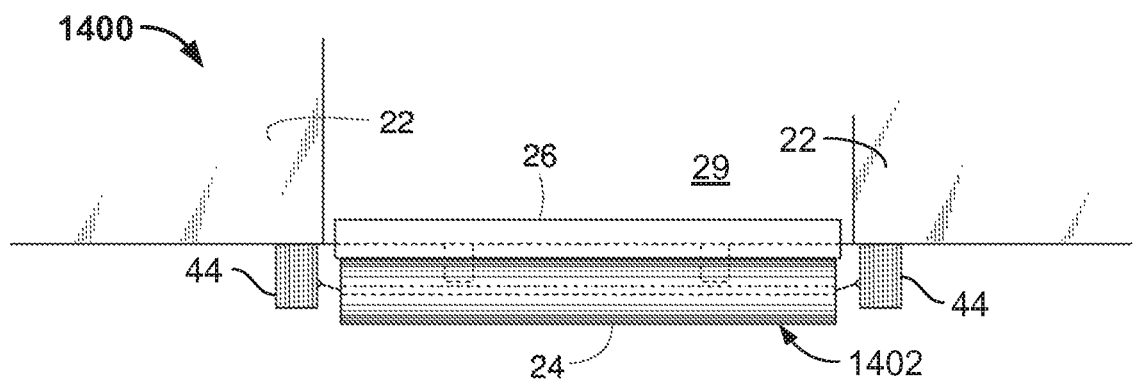
FIG. 15 is a top view of FIG. 14.
Figure 16:
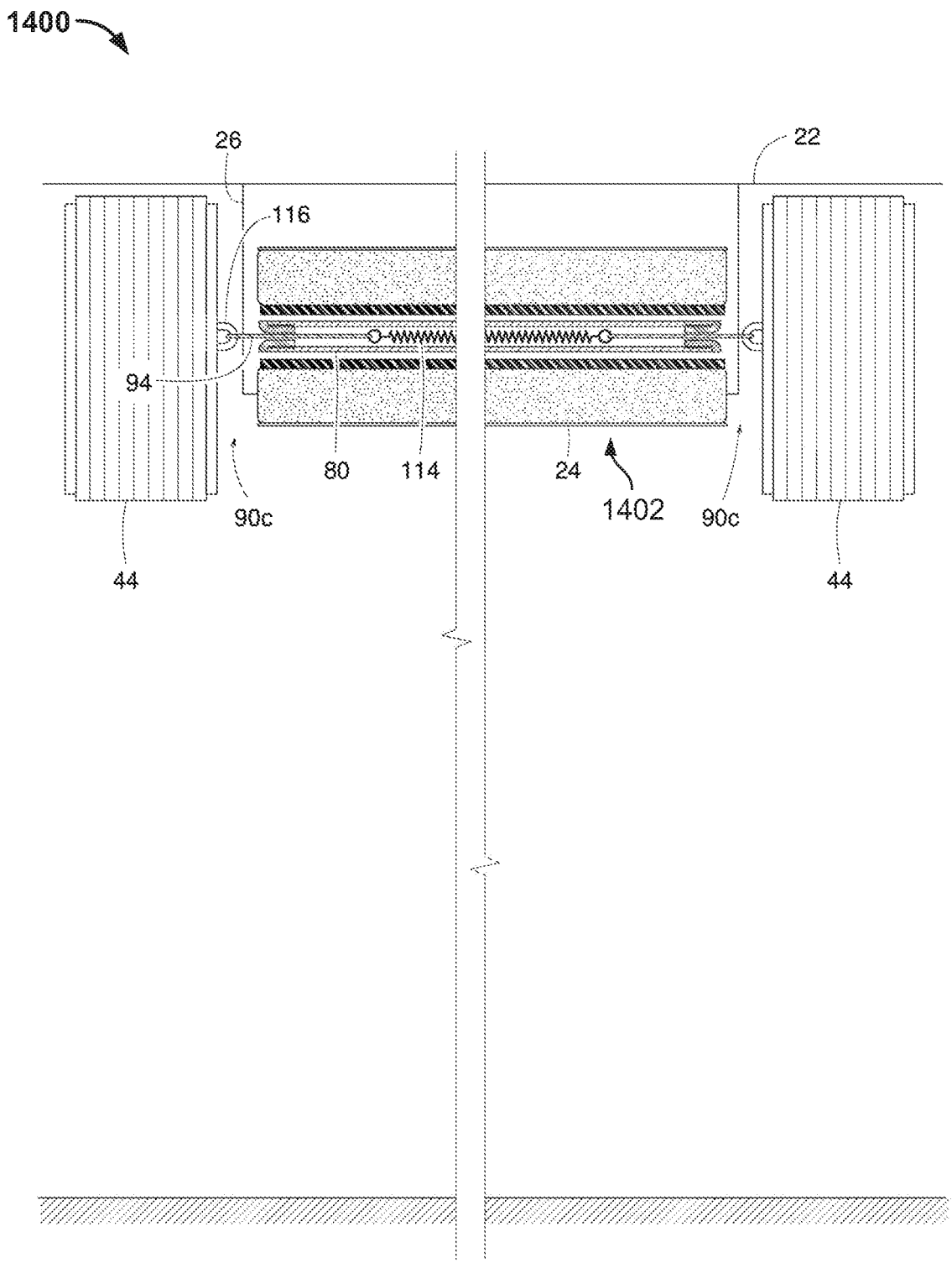
FIG. 16 is a cross-sectional view of an example front seal and an example mounting system of the example seal apparatus of FIG. 14.

FIG. 14 is a front view of the loading dock 1400 that includes a pit-style dock leveler 10c and another example seal apparatus 1402 disclosed herein. FIG. 15 is a top view of the loading dock 1400. FIG. 16 is a cross-sectional view of a mounting system 90c of the example seal apparatus 1402.

The seal apparatus 1402 is similar to the seal apparatus 21 of FIGS. 2-10 and the seal apparatus 1102 of FIGS. 11-13. For example, the seal apparatus 1402 includes a front seal 24 and a rear seal 26. However, the seal apparatus 1402 includes the mounting system 90c. Referring to FIG. 16, the mounting system 90c includes bumpers 44 spaced from lip keepers 50. Unlike the mounting system 90b of FIGS. 11-13, the mounting system 90c of the illustrated example includes a counterweight 92, a tube 112, a bracket 106 and feed rollers 108. The mounting system 90c includes a biasing element 114 (e.g., an extension spring, an elongated spring, etc.) coupled to (e.g., installed within) an axle 80 of the front seal 24. A cable 94 extends through a central bore in a connector 102 (e.g., a bushing) to connect the biasing element 114 to a substantially stationary anchor point 116. The biasing element 114 provides tension to the cable 94 to urge the front seal 24 to a position shown in FIGS. 14-16.

Figure 17:
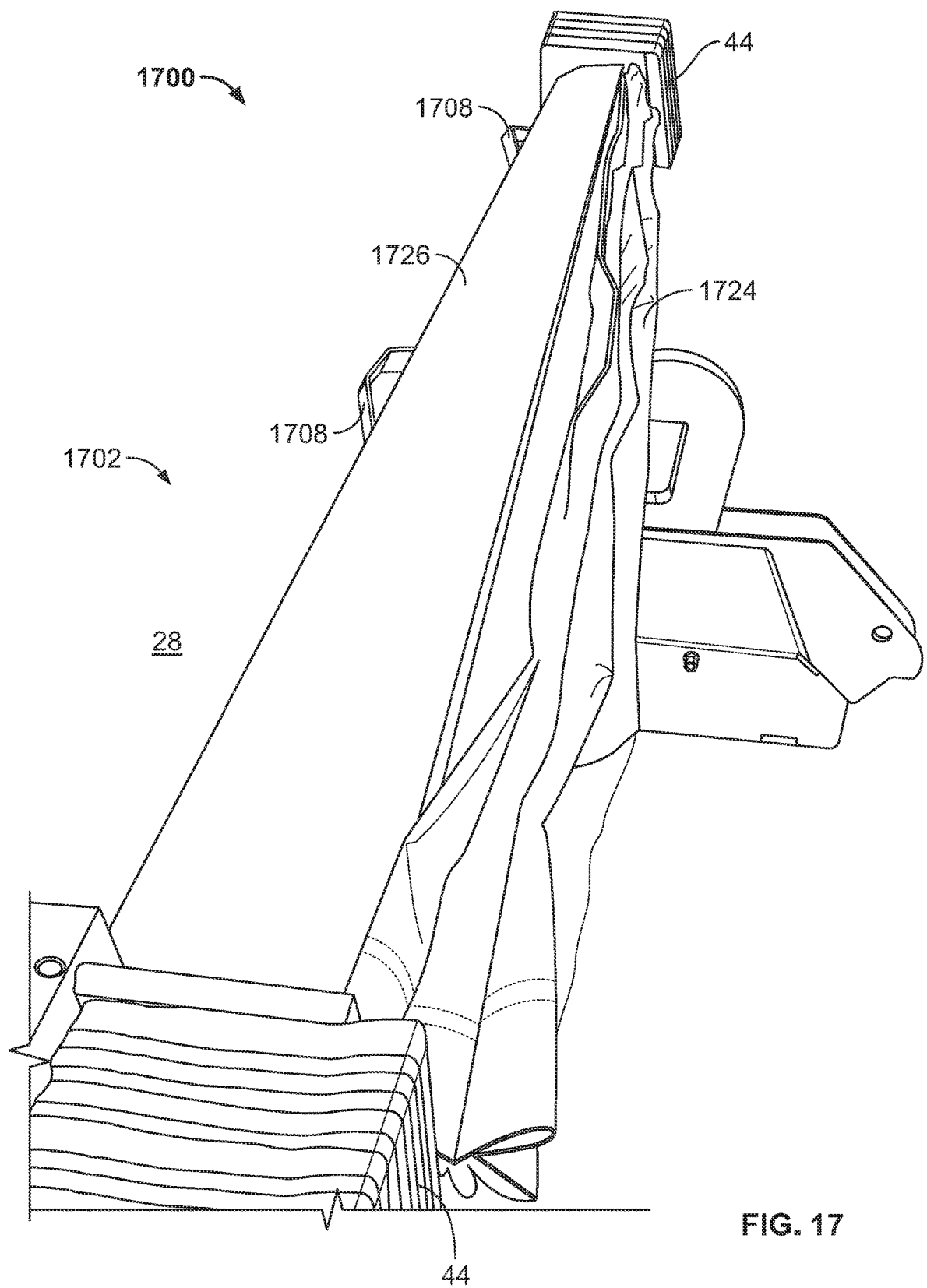
FIG. 17 is a perspective view of another example loading dock having another example seal apparatus disclosed herein.

FIG. 17 is a perspective view of a portion of a loading dock 1700 implemented with another example seal apparatus 1702 disclosed herein. The seal apparatus 1702 of the illustrated example includes a front seal 1724 and a rear seal 1726. The front seal 1724 and the rear seal 1726 are mounted between bumpers 44 (e.g., raised bumpers) of the loading dock 1700. The bumpers 44 are positioned on either side of a dock doorway adjacent a pit 28. To facilitate maneuvering the rear seal 1726, the rear seal 1726 of the illustrated example includes handles 1708.

Figure 18:
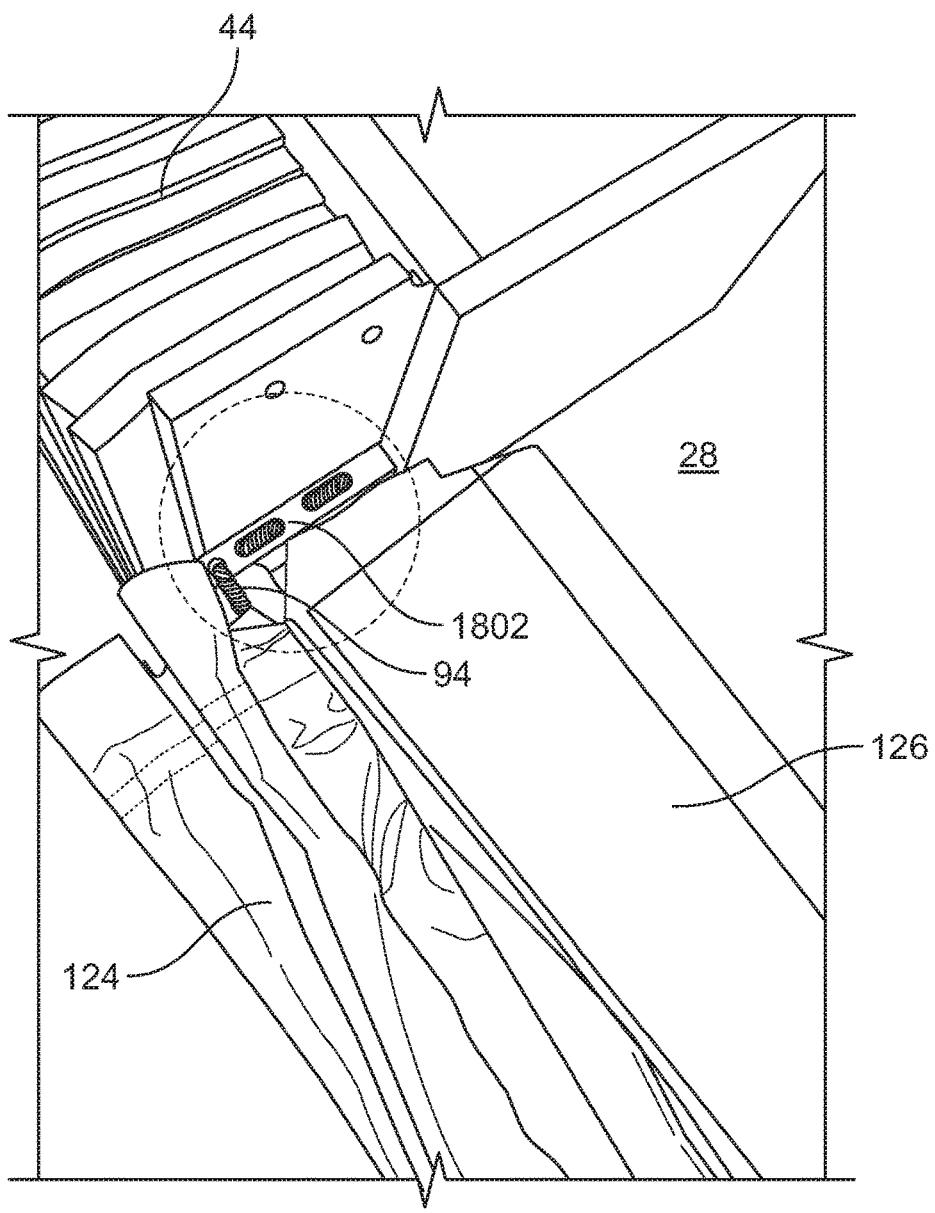
FIG. 18 is a partial, perspective view of the example loading dock of FIG. 17.

FIG. 18 is an enlarged portion of the loading dock 1700 of FIG. 17. To couple to the front seal 1724 to a dock face via the bumpers 44, the seal apparatus 1702 of the illustrated example includes a front seal mounting fixture 1802.

Figure 19:
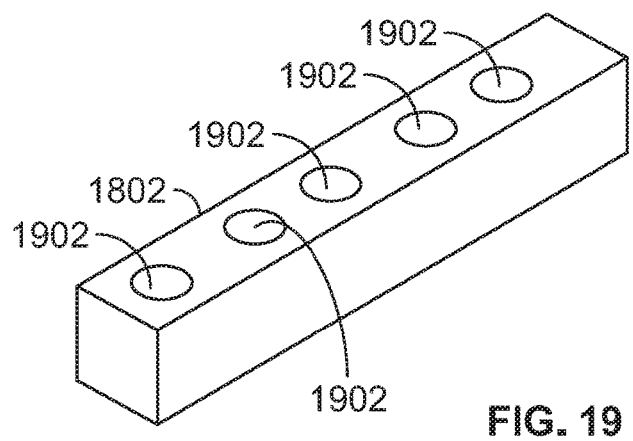
FIG. 19 is a perspective view of an example front seal mounting fixture of the example seal apparatus of FIGS. 17-18.

FIG. 19 is an enlarged, perspective view of the front seal mounting fixture 1802 of FIG. 18. Referring to FIGS. 18 and 19, the front seal mounting fixture 1802 (e.g., a bracket) is coupled (e.g., affixed or welded) to either side of the dock face or other equipment such as the bumpers 44 located at the dock face on either side of the doorway proximate the pit 28 of the loading dock 1700. Respective ends of a cable 94 (e.g., a flexible elongate member or chord) of the front seal 1724 couple or attach to the respective front seal mounting fixtures 1802. Thus, the front seal mounting fixture 1802 provides an anchor to couple the front seal 1724 to the loading dock 1700. The respective ends of the cable 94 can be woven (i.e., snaked) through one or more apertures 1902 formed in the front seal mounting fixture 1802 to secure or couple the front seal 1724 to the dock face. In some examples, the front seal mounting fixture 1802 (e.g., bracket) can be mounted in a first orientation (e.g., a longitudinal axis of the body vertically), a second orientation (e.g., a longitudinal axis of the body horizontally), and/or any other orientation.

Figure 20:
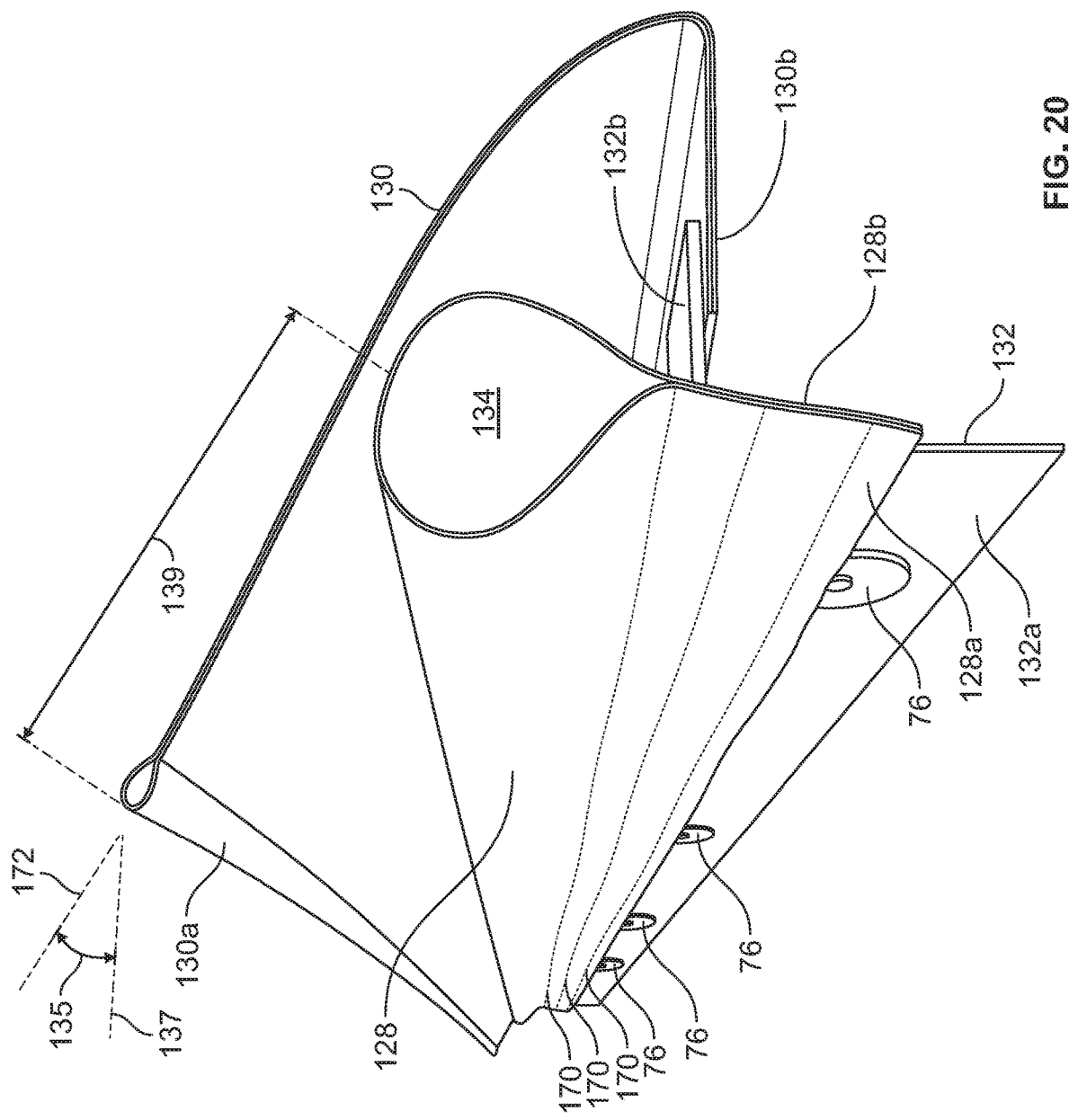
FIG. 20 is a side view of an example rear seal of the example seal apparatus of FIG. 17.
Figure 24:
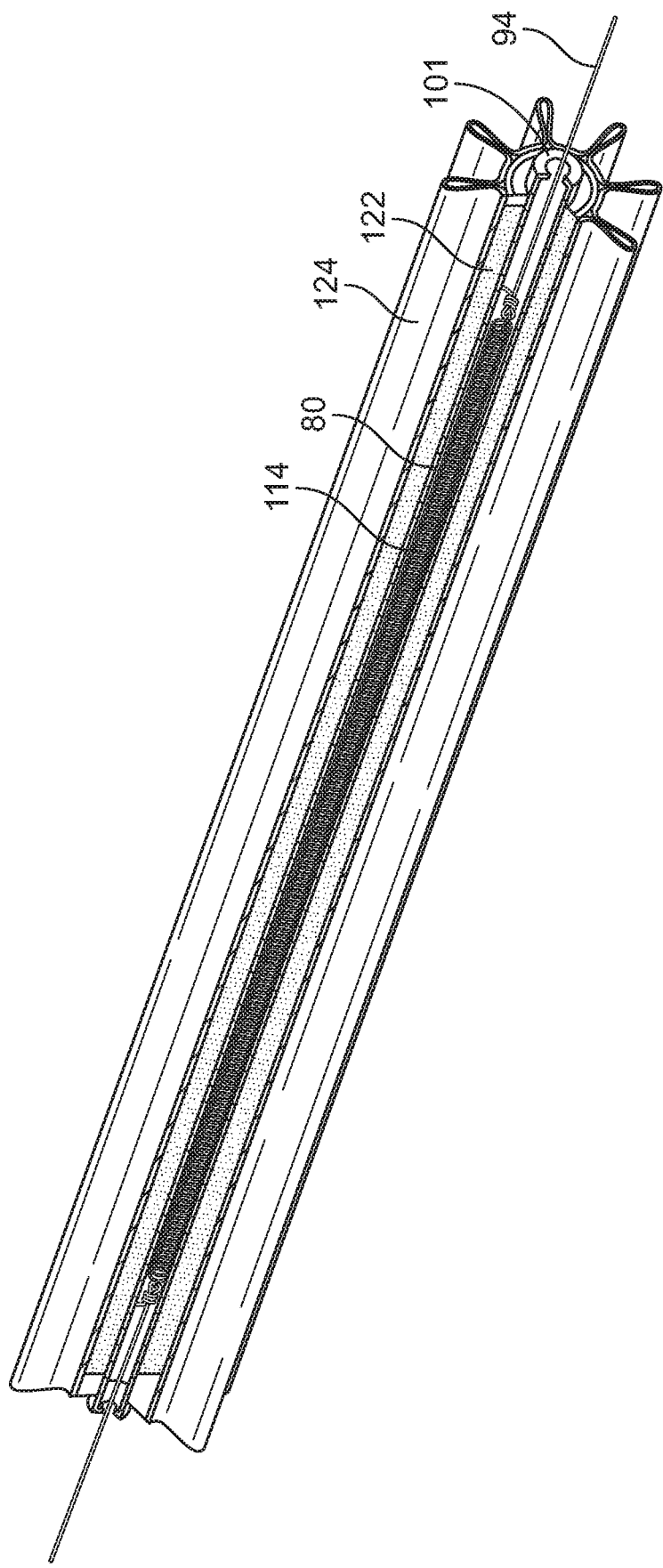
FIG. 24 is a cutaway view of the example front seal of FIGS. 17 and 23.

FIG. 20 is a perspective view of the example rear seal 1726 of FIGS. 17-19. The rear seal 1726 of the illustrated example includes a compressible core 128, a cover 130, and a rear seal mounting bracket 132. The compressible core 128 of the illustrated example is a bulb seal. For example, the compressible core 128 of the illustrated example defines a cavity 134 (e.g., a collapsible cavity) extending (e.g., completely) between the respective ends of the rear seal 1726. The compressible core 128 of the illustrated example is formed from a flexible material or fabric (e.g., vinyl, a flexible plastic, etc.) For example, the compressible core 128 can be formed of foam, rubber, a compressible material, a resilient material, and/or any other suitable material(s). Additionally, the compressible core 128 of the illustrated example is formed from a unitary sheet of material. To form the compressible core 128, a first end 128a of the flexible material defining the compressible core 128 is folded over relative to a second end 128b of the flexible material defining the compressible core 128. In other words, the first end 128a of the illustrated example is positioned adjacent to the second end 128b. The first end 128a is attached or coupled to the second end 128b. For example, the first end 128a is coupled to the second end 128b via one or more fasteners 170. The fasteners 170 of the illustrated example are sewing stitches. Thus, the first end 128a of the illustrated example is sewn to the second end 128b via one or more fasteners 170 (e.g., sewing stitches) to form the compressible core 128. However, in other examples, the one or more fasteners 170 can include adhesive, hook-and-loop fasteners, and/or any other fastener(s). The compressible core 128 forms a resilient, deformable seal. For example, the compressible core 128 deforms when a vehicle 20 and/or a dock leveler 10 engages the seal apparatus 1702. For example, the cavity 134 of the compressible core 128 of the illustrated example is an air cavity and can collapse during a loading and/or unloading operation. The compressible core 128 has a resilient characteristic and returns to a non-deformable position or shape (e.g., as shown in FIG. 24) when the vehicle 20 and/or the dock leveler 10 disengage the rear seal 1726.

The cover 130 is composed of a resilient material and includes a first end 130a and a second end 130b opposite the first end 130a. The first end 130a of the cover 130 projects outwardly (e.g., is cantilevered) in a direction away from a dock face 40. For example, a longitudinal axis 172 of the first end 130a extends from the compressible core 128 at an angle 135 from orthogonal 137. In some examples, the angle 135 can be approximately between 5 degrees and 15 degrees. Additionally, the first end 130a of the cover 130 extends from the compressible core 128 a distance 139. The distance 139 of the illustrated example can be between approximately six inches and two feet.

To mount the seal apparatus 1702 to the loading dock, the seal apparatus 1702 includes the rear seal mounting bracket 132. The rear seal mounting bracket 132 has a first leg 132a and a second leg 132b (e.g., an L-bracket). The first leg 132a mounts the rear seal 1726 to the dock face 40 via the first leg 132a of the rear seal mounting bracket 132. The first leg 132a supports the fasteners 74 to mount the compressible core 128 to the loading dock 1700. The second leg 132b couples the second end 130b of the cover 130 to the loading dock 1700. The first end 130a is cantilevered from the compressible core 128.

Figure 21A:
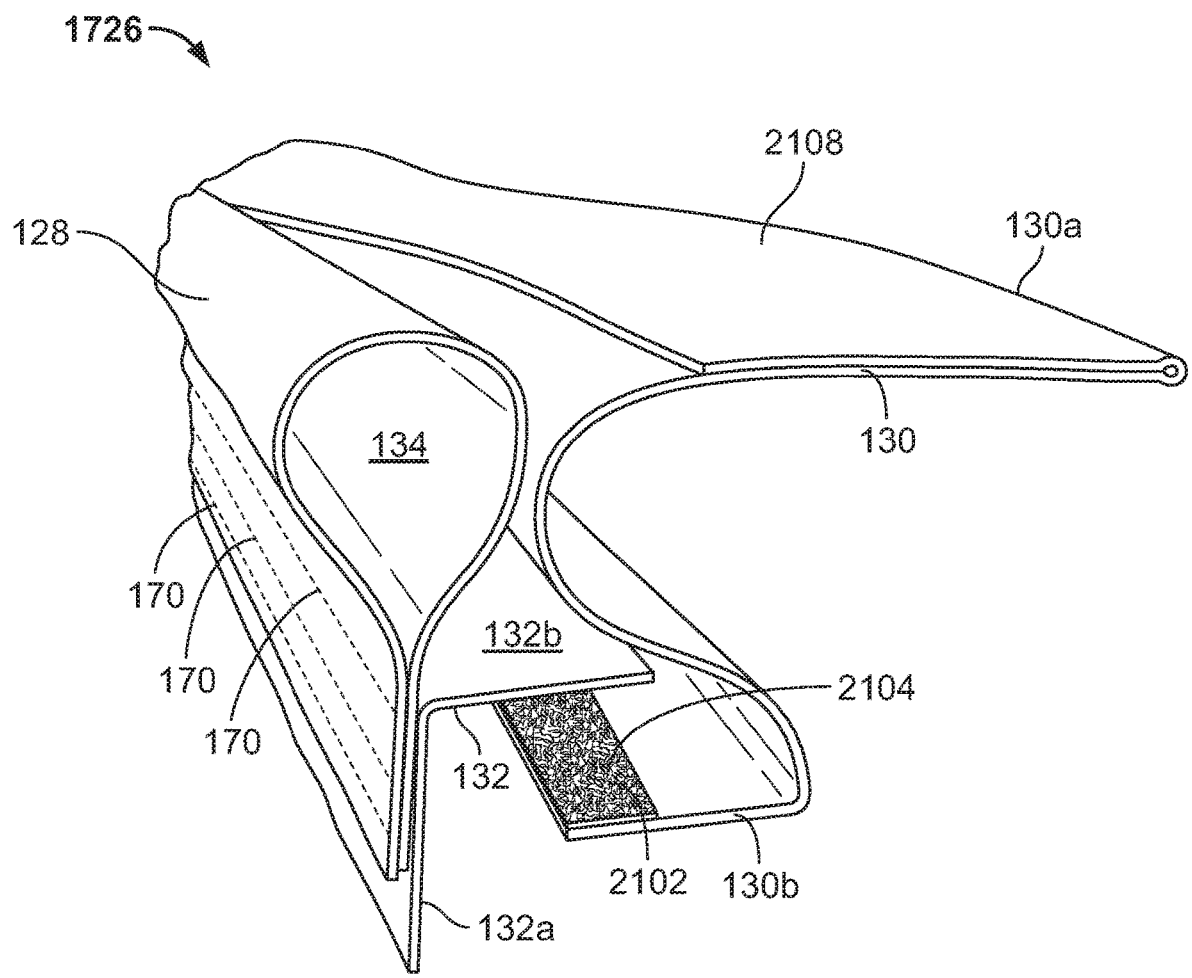
FIGS. 21A and 21B is a partially assembled views of the example rear seal of the example seal apparatus of FIGS. 17-20.
Figure 21B:
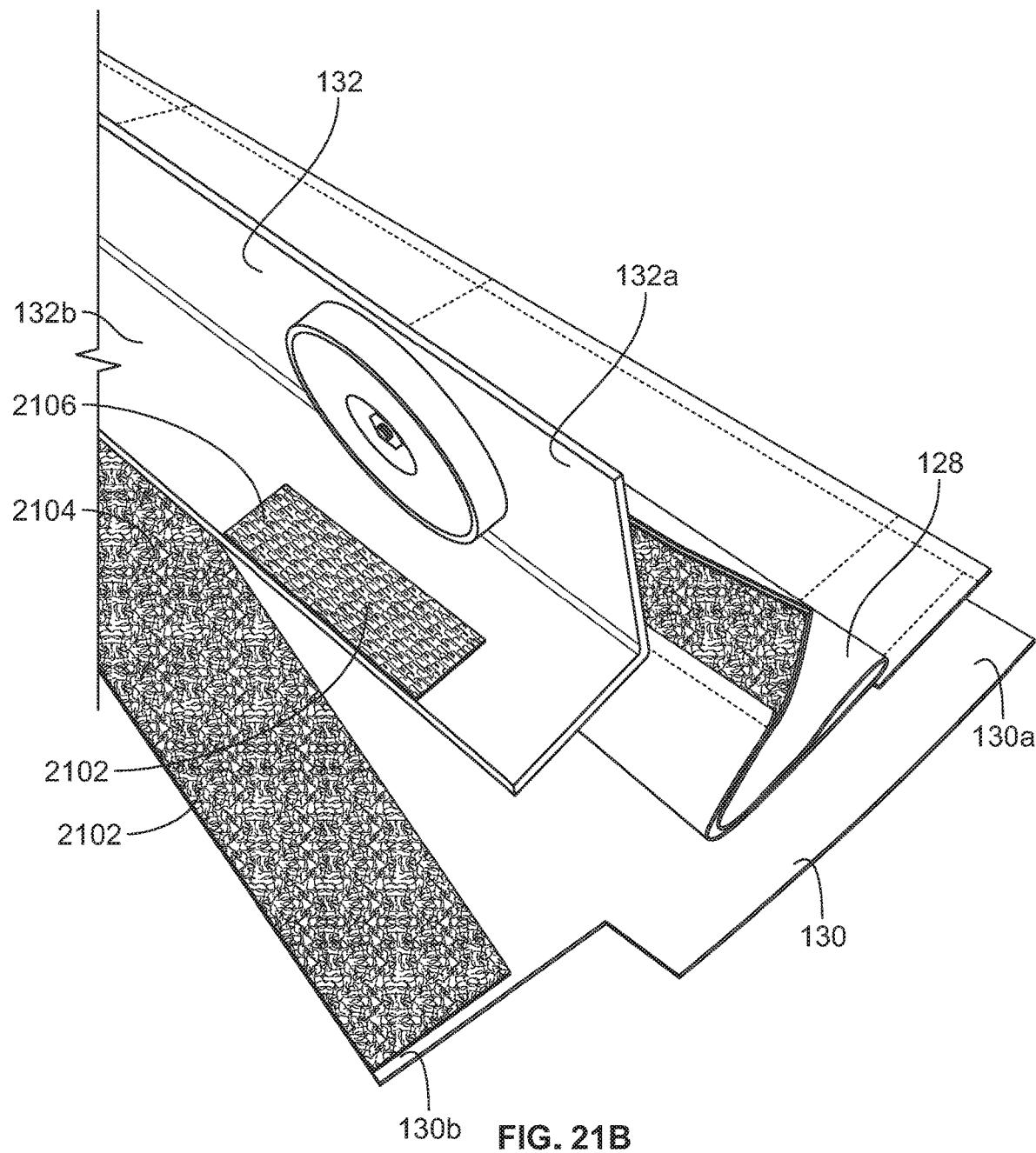

FIGS. 21A and 21B perspective views of the rear seal 1726 in a partially assembled state. Referring to FIGS. 21A and 21B, the cover 130 is detached from the rear seal mounting bracket 132. To attach the cover 130 to the compressible core 128 and the rear seal mounting bracket 132, the second end 130b of the cover 130 is coupled to the second leg 132b of the rear seal mounting bracket 132. In the illustrated example, the second end 130b of the cover 130 is coupled to the rear seal mounting bracket 132 via a fastener 2102 (e.g., a removable or releasable fastener, a tool-free fastener). The fastener 2102 of the illustrated example is a hook-and-loop fastener. Thus, the second end 130b of the cover 130 includes a first portion 2104 (e.g., a hook portion) of the fastener 2102 and the second leg 132b of the rear seal mounting bracket 132 includes a second portion 2106 (e.g., a loop portion) of the fastener 2102. In some examples, the fastener 2102 can be adhesive, clamps and/or any other suitable fastener(s). Additionally, to increase a rigidity of the cover 130, at least a portion 2108 of the cover 130 can be folded onto itself to define the first end 130a.

Figure 22:
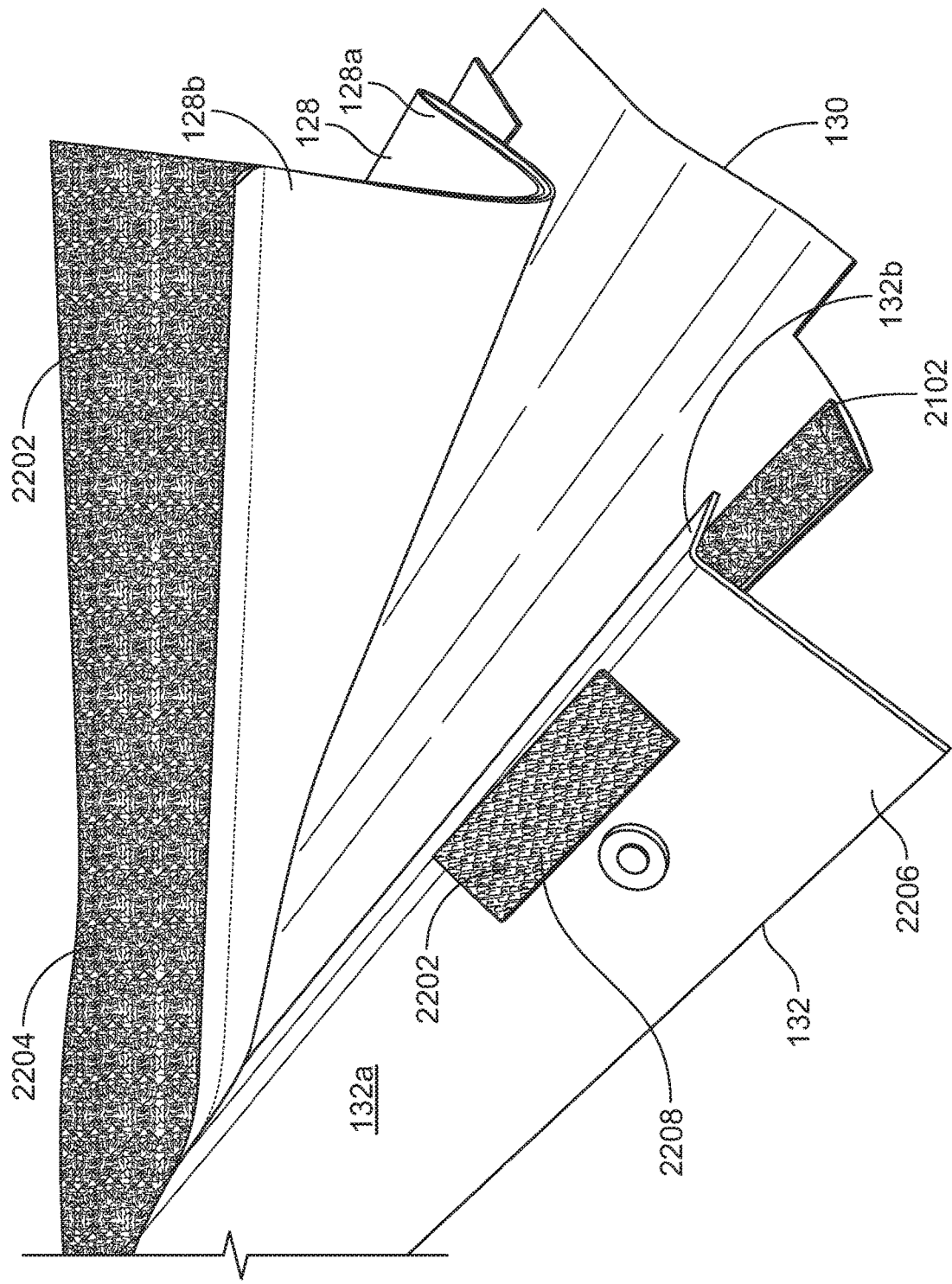
FIG. 22 is another partially assembled view of the example rear seal of the example seal apparatus of FIGS. 17-20.

FIG. 22 is another partially assembled view of the example rear seal 1726 of FIG. 17. The compressible core 128 couples to the rear seal mounting bracket 132. Specifically, the second end 128b of the compressible core 128 couples to the rear seal mounting bracket 132 via a fastener 2202. For example, the second end 128b of the compressible core 128 includes a first portion 2204 (e.g., a hook portion) of the fastener 2202 and an outer surface 2206 of the rear seal mounting bracket 132 includes a second portion 2208 (e.g., a loop portion) of the fastener 2202. For example, the fastener 2202 is a hook-and-loop fastener. However, in some examples, the cover 130 can couple to the rear seal mounting bracket 132 via adhesive, screws, claps and/or any other suitable fastener(s). In some examples, the core 128 and the cover 130 are formed from a unitary piece of material or structure (e.g., fabric). For example, the core 128 and the fabric 130 can be shaped from a continuous sheet such that the core 128 and the cover 130 are connected or coupled (e.g., the cover 128 and the sheet 130 include a first end defining the first end 130a of the cover 130 and a first end 128a of the core 128). In some examples, at least a portion of the material defining the core 128 and the cover 130 wraps around at least a portion of the mounting bracket 132 (e.g., the first leg 132a and/or the second leg 132b).

Figure 23:
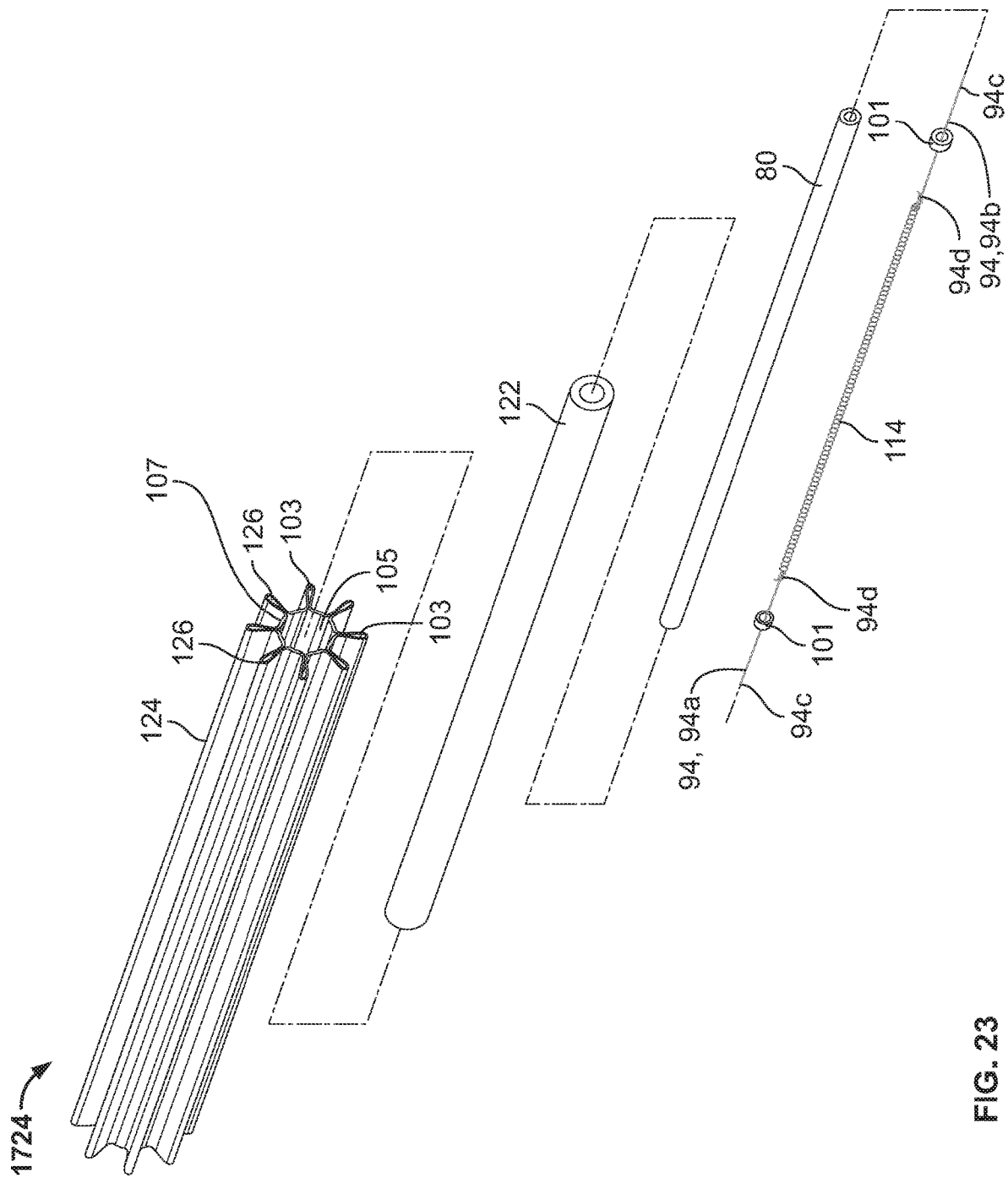
FIG. 23 is an exploded view of an example front seal of the example seal apparatus of FIG. 17.
Figure 25:
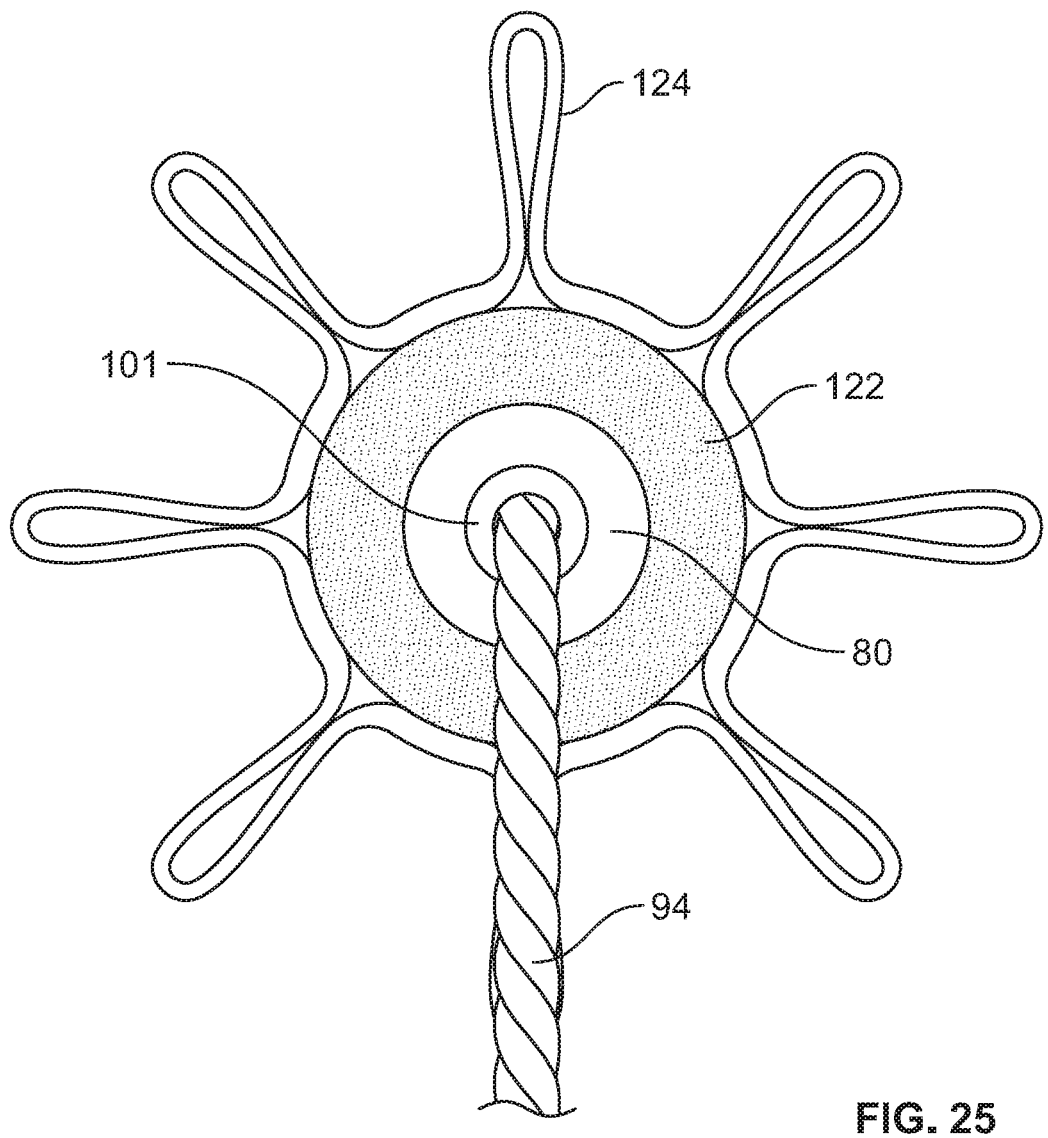
FIG. 25 is a side view of the example front seal of FIGS. 17 and 23.

FIGS. 23-25 illustrate the front seal 1724. FIG. 23 is an exploded view of the front seal 1724 of FIG. 17. FIG. 24 is a sectional view of the front seal 1724 of FIG. 27. FIG. 25 is an assembled, side view of the front seal 1724. The front seal 1724 of the illustrated example includes an outer cover 124, a compressible core 122 (e.g., a foam core, a foam cylinder), an axle 80, a cable 94 (e.g., a rope, a chord, string, etc.), a biasing element 114 (e.g., a spring) and a retainer 101 (e.g., an end cap). The outer cover 124 of the illustrated example includes a plurality of openings 103 to form a plurality of flexible flaps 126 (e.g., radial fins) when the outer cover 124 is in an assembled state. The flexible flaps 126 are deformable and/or flexible. The compressible core 122 is positioned in a cavity 105 formed by the outer cover 124 and the axle 80 (e.g., a plastic tube) is positioned in the compressible core 122. In other words, the axle 80 (e.g., a plastic tube, a metal tube, etc.) is covered by the compressible core 122. In other examples, the axle 80 can be covered by other elastically deformable material(s). The front seal 1724 is designed to withstand flexion and compression and return to its original shape. In some examples, the flexible flaps 126 (e.g., of fabric/material, foam, rubber, etc.) extend outwardly from an outer surface of the outer cover 124.

The cable 94 couples to the axle 80. For example, the cable 94 includes a first portion 94a and a second portion 94b. Respective inner ends 94c of the first portion 94a and the second portion 94b are coupled to the biasing element 114 and respective outer ends 94d of the first portion 94a and the second portion 94b couple to the front seal mounting fixture 1802. Retainers 101 retain the biasing element 114 coupled to the axle 80. Each of the retainers 101 (e.g., an outer surface of the retainers 101) includes a fastener 2502 (e.g., a releasable fastener, a loop-and-hook fastener) to releasably couple to the outer cover 124. The respective outer ends 94d of the first portion 94a and the second portion 94b couple to the respective front seal mounting fixture 1802 to retain or couple the front seal 1724 to the loading dock 1700. During operation, the biasing element 114 enables the front seal 1724 to move relative to the rear seal 1726 and/or the dock face 40 (e.g., move in the upward direction 34, the downward direction 36, the rearward direction 32, the forward direction 30, the lateral direction 38, and/or any combination thereof and/or any other direction). In other words, the front seal 1724 can move relative to the bumpers 44 and/or the rear seal 1726 via the biasing element 114.

Figure 26:
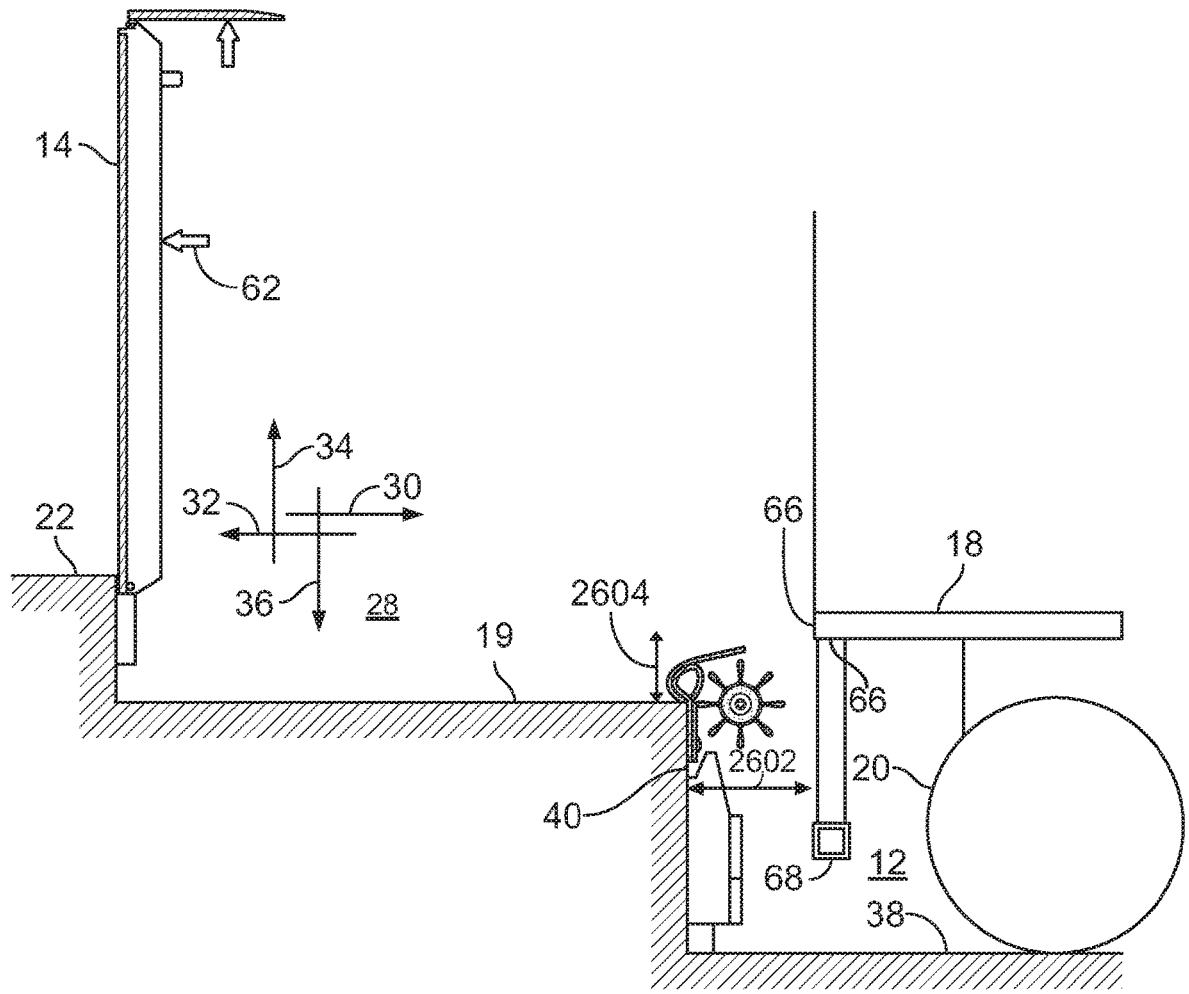
FIG. 26 is a side view of the example loading dock of FIG. 17 showing an example loading dock in an example stored position.

FIG. 26 is a side view of the example loading dock 1700 of FIG. 17. The seal apparatus 1702 seals a first gap 2602 (e.g., in an x-z plane) between the rear edge 66 of the vehicle 20 and the dock face 40 and a second gap 2604 (e.g., an x-y plane) between the cover 130 and the rear edge 66 of the vehicle 20. To seal the first gap 2602, the cover 130 of the rear seal 1726 extends or projects from the dock face 40 toward the vehicle 20 with an upward angle provided by the compressible core 128 to engage or seal an under surface of the rear edge 66 of the vehicle 20.

Figure 27:
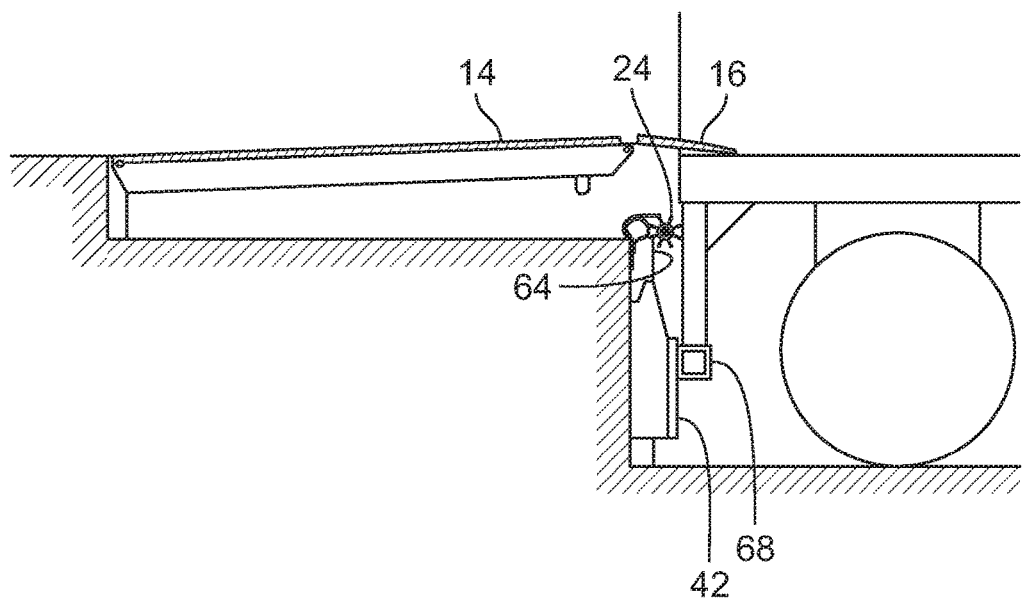
FIG. 27 is a side view of the example loading dock of FIG. 17 showing the example loading dock in a standard loading position.
Figure 28:
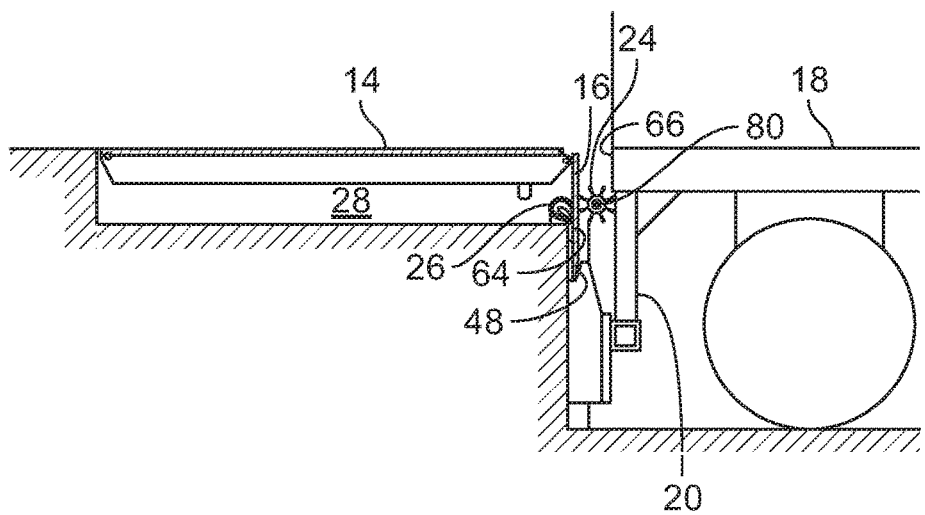
FIG. 28 is a side view of the example loading dock of FIG. 17 showing the example loading dock in an example cross-traffic position.
Figure 29:
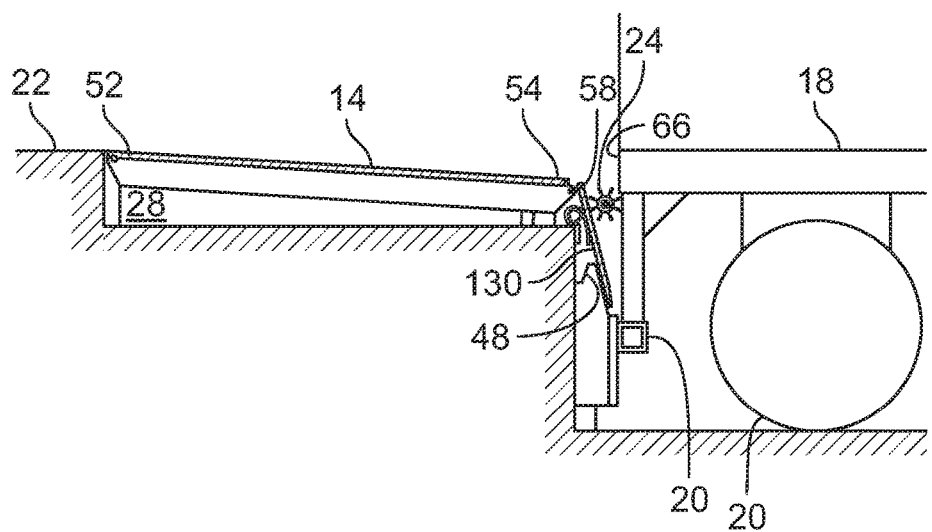
FIG. 29 is a side view of the example loading dock of FIG. 17 showing the example loading dock in an example below-dock position.

FIGS. 27-29 are side views of the loading dock 1700 showing a dock leveler 10 at various operational positions.

FIG. 27 illustrates the dock leveler 10 in a standard loading position. In the standard loading position, a deck 14 is in a lowered position and a lip 16 is in an extended position (e.g., partially or fully extended). The seal apparatus 1702 operates and functions the same as the operation and/or function the seal apparatus 23 of FIGS. 2-16. In the example of FIG. 27, the front seal 1724 and/or the cover 130 of the rear seal 1726 can engage an underside of the rear edge 66 of the vehicle 20 to provide a seal. For example, the front seal 1724 seals the first gap 2602 and the cover 130 seals the second gap 2604 that may exist when the front seal 1724 does not engage the undersigned of the rear edge 66 of the vehicle 20.

FIG. 28 illustrates the dock leveler 10 at a cross-traffic position. FIG. 29 illustrates the dock leveler 10 at a below-deck position. Like the seal apparatus 21 of FIGS. 2-16, the lip 16 of the dock leveler 10 is positionable between the front seal 1724 and the rear seal 1726 during an end-load or below-dock loading and/or unloading operation. In other words, the front seal 1724 is positionable on an exterior side of the lip 16 and the rear seal 1726 is positionable on an interior side of the lip 16 when the dock leveler 10 is positioned for an end-load or below-deck end load loading and/or unloading operation. In the examples of FIGS. 28 and 29, the lip 16 causes the cover 130 to deflect between the compressible core 128 and the front seal 1724 when the lip 16 is positioned between the front seal 1724 and the rear seal 1726. The front seal 1724 provides a seal between the rear edge 66 of the vehicle 20 and the dock face 40 and the rear seal 1726 provides a seal to a front hinge 58 of the dock leveler 10. The front seal 1724 seals both the first gap 2602 and the second gap 2604 and the rear seal 1726 seals a third gap formed at the front hinge 58. In some examples, the front seal 1724 and/or the rear seal 1726 engages at least a portion of a surface adjacent the rear edge 66 that is oriented toward the dock face 40 or a portion of a surface adjacent the rear edge 66 that is oriented toward the driveway 37.

Figure 30:
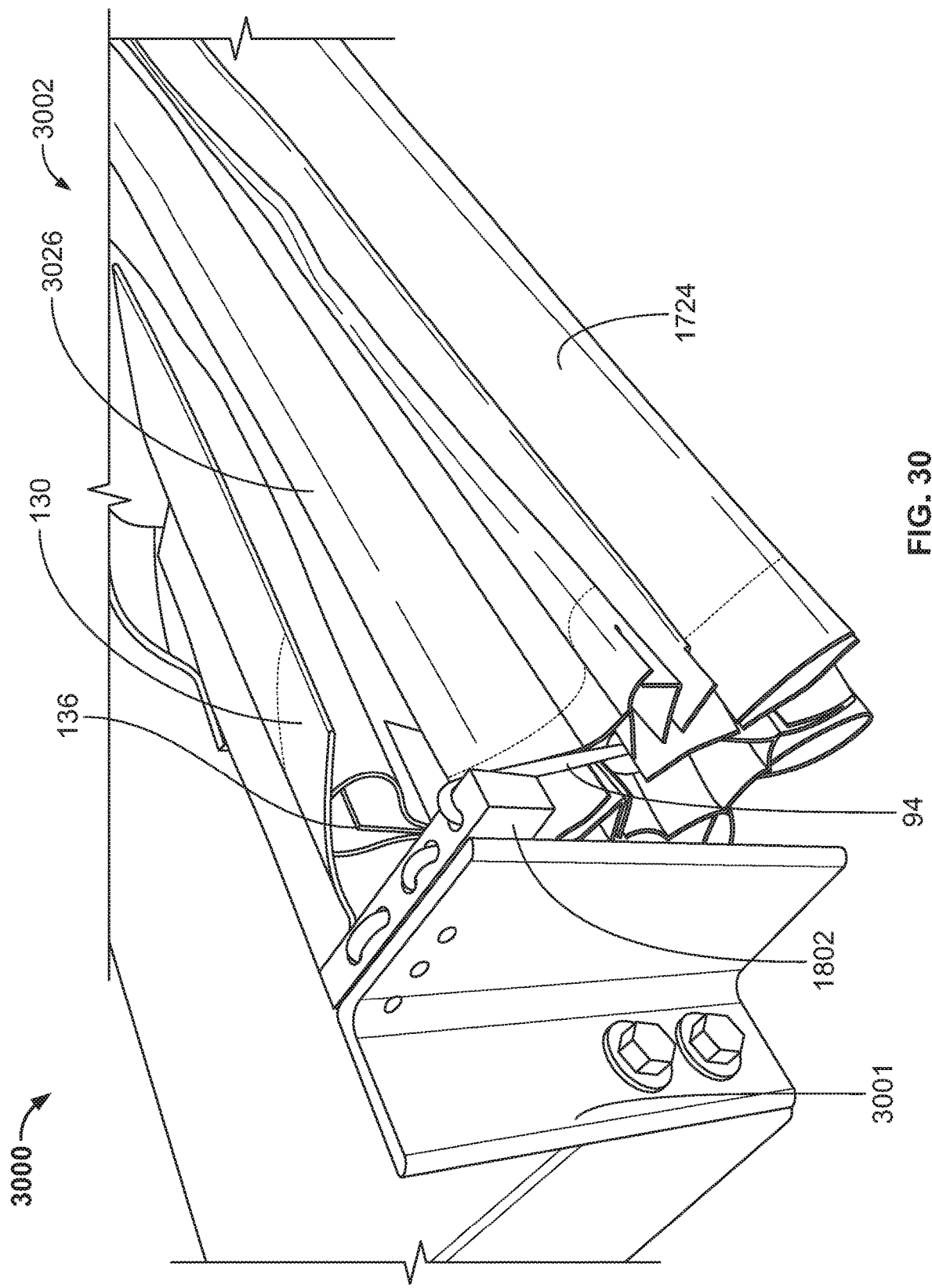
FIG. 30 is a partial perspective view of an example loading dock having another example seal apparatus disclosed herein.

FIG. 30 is a partial, perspective view of another example loading dock 3000 having an example seal apparatus 3002 disclosed herein. The seal apparatus 3002 of the illustrated example includes a front seal 1724 and a rear seal 3026. The front seal 1724 is identical to the front seal 1724 of FIG. 17. The front seal 1724 is coupled to the loading dock 3000 via the front seal mounting fixture 1802 and the cable 94. The front seal mounting fixture 1802 is attached to a bracket 3001 (e.g., a plate) of the loading dock 3000.

Figure 31:
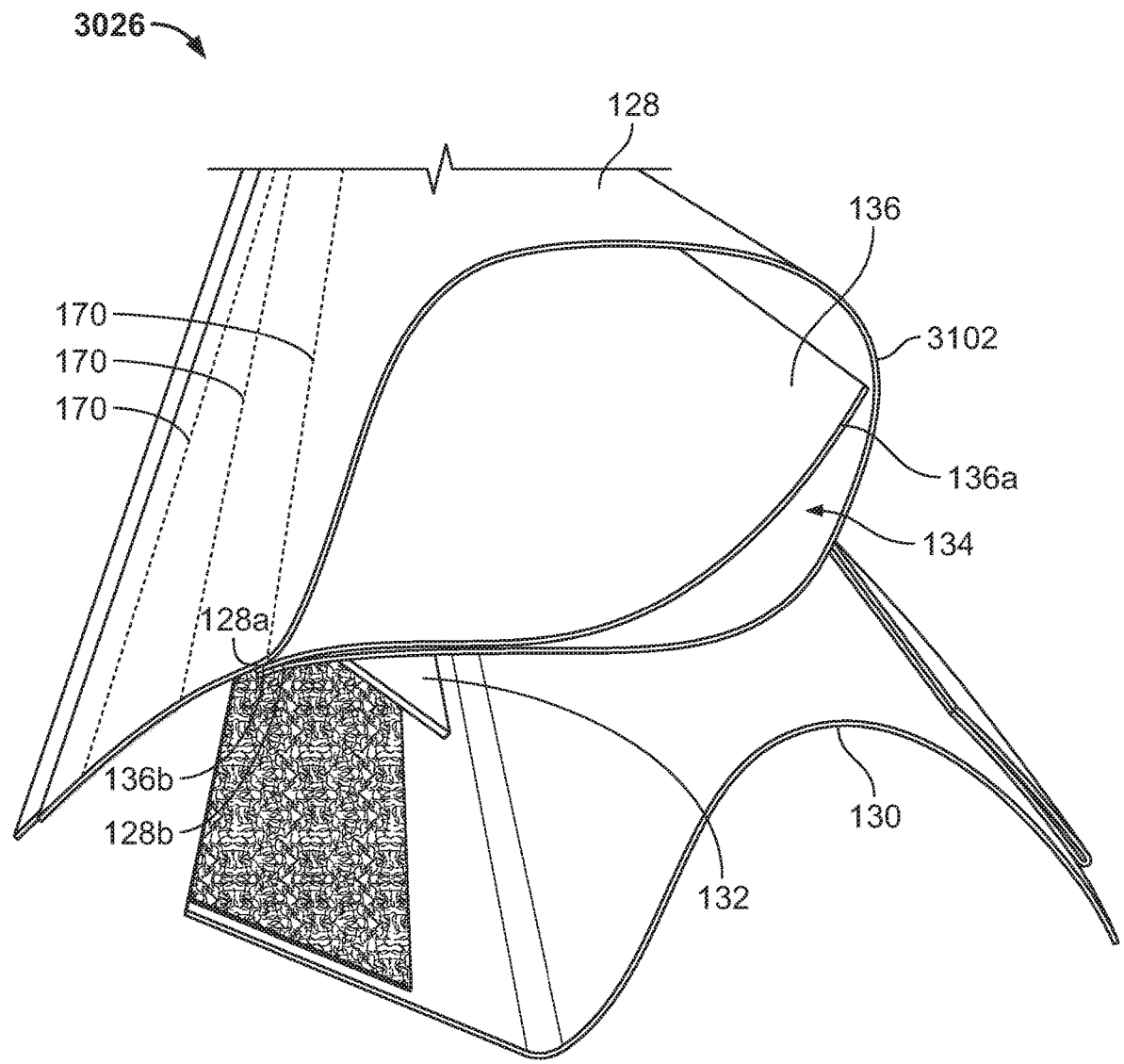
FIG. 31 is partially assembled, side view of an example rear seal of the example seal apparatus of FIG. 30.
Figure 32:
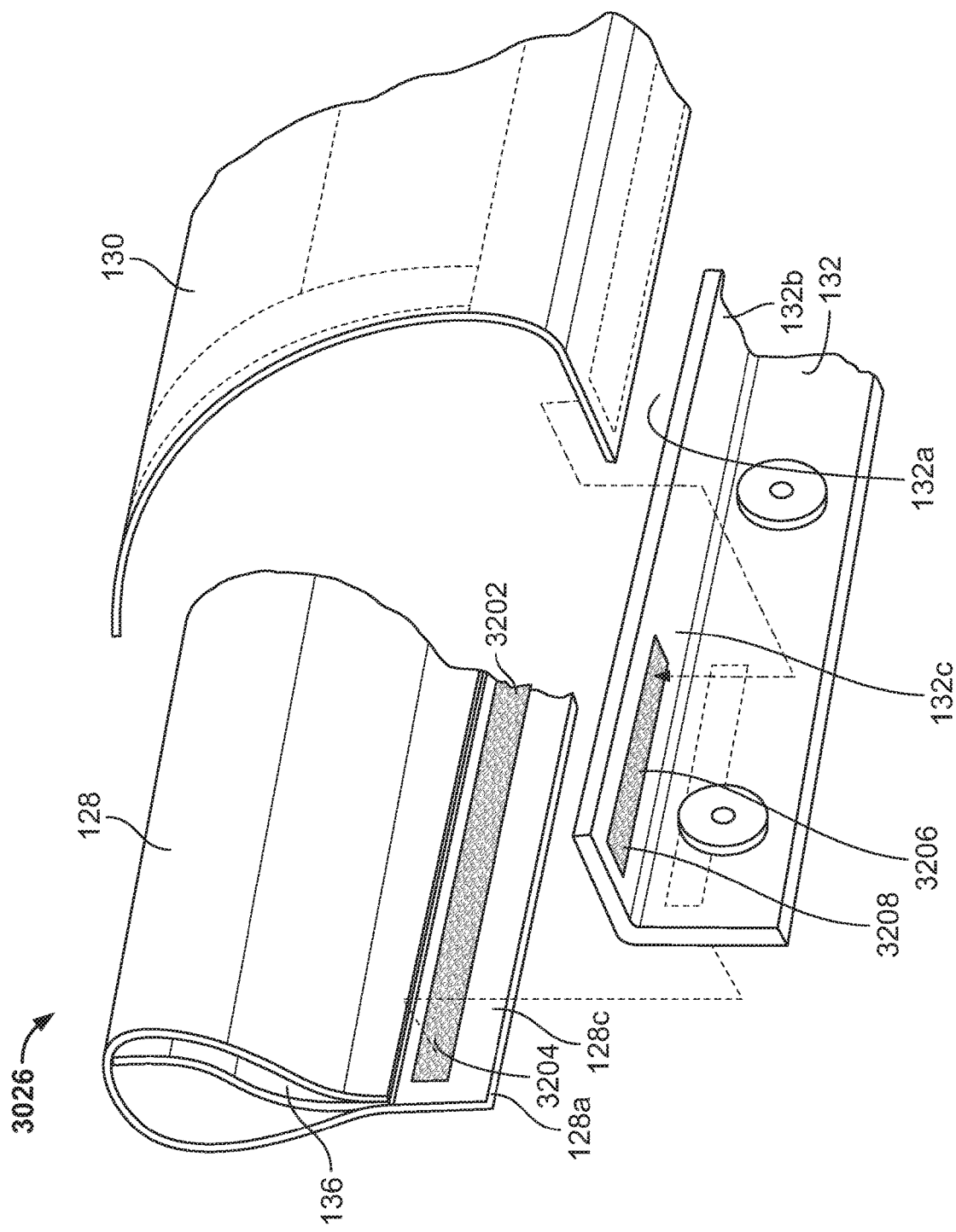
FIG. 32 is a perspective exploded view of the example rear seal of FIGS. 30-31.

FIGS. 31 and 32 are partially assembled views of the rear seal 3026 of FIG. 30. The rear seal 3026 of the illustrated example is substantially similar to the rear seal 1726 of FIGS. 17-29. For example, the rear seal 3026 includes a compressible core 128, a cover 130, and a rear seal mounting bracket 132. However, the rear seal 3026 of the illustrated example includes a reinforcement seal 136 positioned in the cavity 134 of the compressible core 128. The reinforcement seal 136 can be a flexible panel, a rigid panel, and/or any other panel to support the compressible core 128. For example, the reinforcement seal 136 helps to restore a shape of the compressible core 128 to a non-compressed state after a vehicle 20 and/or a lip 16 of the dock leveler 10 compresses the compressible core 128. For example, during a loading and/or unloading operation, the compressible core 128 can collapse (e.g., reduce a volume of the cavity 134) in response to engagement with a vehicle 20 and/or a dock leveler 10. The reinforcement seal helps restore a volume of the cavity 134 of the compressible core 128 to an initial, non-compressed position after the vehicle 20 and/or the lip 16 disengage the compressible core 128. The reinforcement seal 136 includes a first end 136a and a second end 136b opposite the first end 136a. The first end 136a projects into the cavity 134 and is structured to engage an apex 3102 of the compressible core 128. The second end 136b is positioned between the first end 128a and the second end 128b of the compressible core 128. In other words, the second end 136b of the reinforcement seal 136 is sandwiched between the first end 128a and the second end 128b of the compressible core 128. The fasteners 170 (e.g., sewing stitches) couple the reinforcement seal 136 to the compressible core 128.

Figure 33:
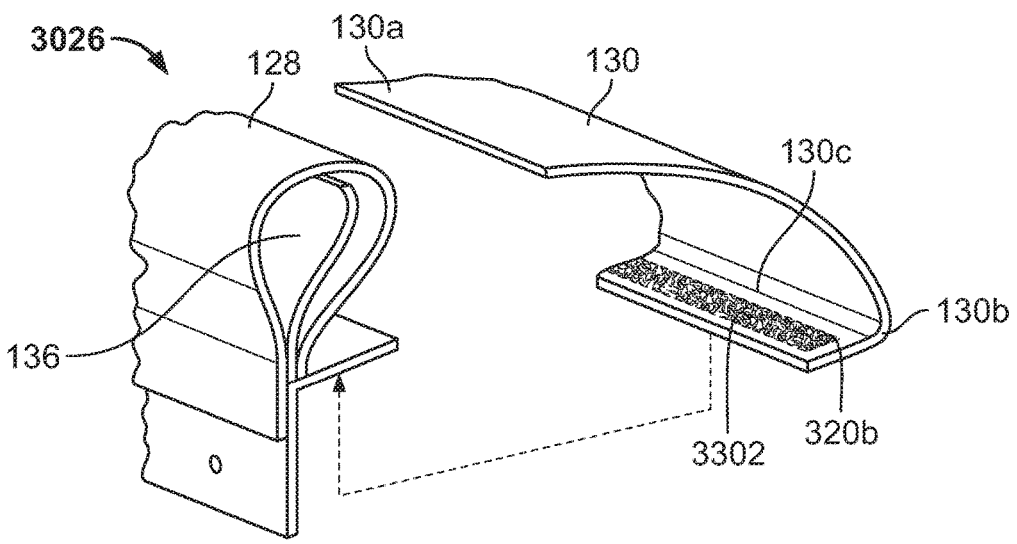
FIG. 33 is a perspective, partially exploded view of the example rear seal of FIGS. 30-32.

FIGS. 32 and 33 are perspective, partially assembled views of the rear seal 3026 of FIGS. 30-31. To couple the compressible core 128 and the rear seal mounting bracket 132, the rear seal 3026 include a first fastener 3202. The first fastener includes a first portion 3204 coupled to a rear surface 128c of the first end 128a of the compressible core 128 and a second portion 3402 coupled to a front surface 132c of the first leg 132a of the rear seal mounting bracket 132. To couple the cover 130 to the rear seal mounting bracket 132, the rear seal 3026 includes a second fastener 3206. The second fastener 3206 includes a first portion 3208 coupled to a bottom surface 132d of the second leg 132b of the rear seal mounting bracket 132 and a second portion 3302 coupled to an inner surface 130c of the second end 130b of the cover 130. The first fastener 3202 and the second fastener 3206 of the illustrated example are hook-and-loop fasteners. However, in some examples, the first fastener 3202 and/or the second fastener 3206 can be adhesive and/or any other fastener(s).

Figure 34:
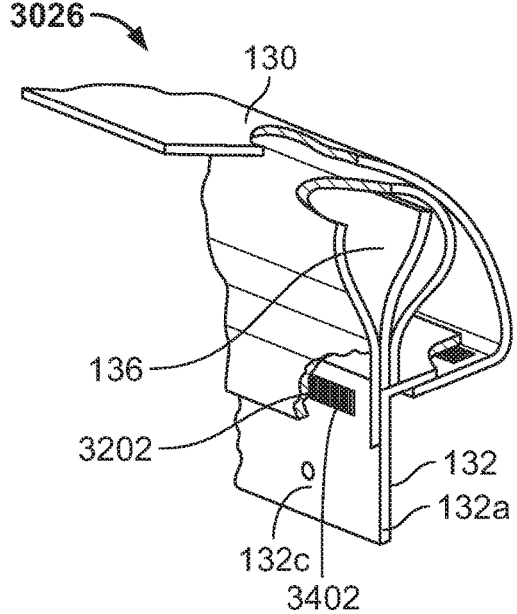
FIG. 34 is a partial cutaway view of the example rear seal of FIGS. 30-33.
Figure 35:
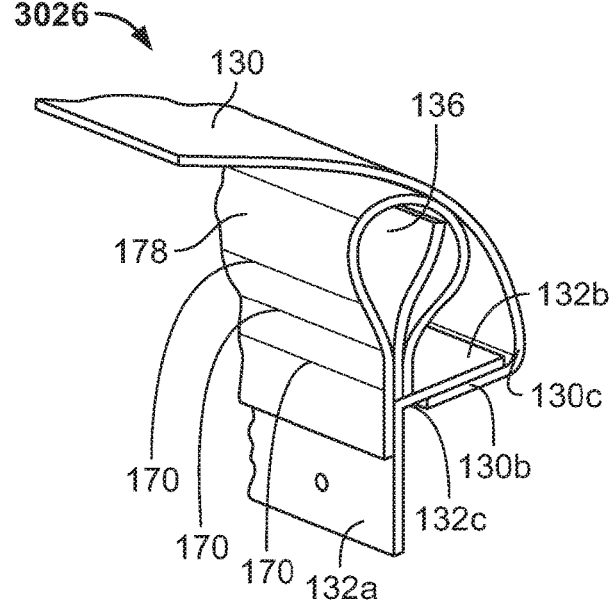
FIG. 35 is a perspective view of a portion of the example rear seal of FIGS. 30-34.

FIG. 34 is a perspective, cutaway assembled view of the rear seal 3026 of FIGS. 30-33. FIG. 35 is a perspective, assembled view of the rear seal 3026 of FIGS. 30-34.

Figure 36:
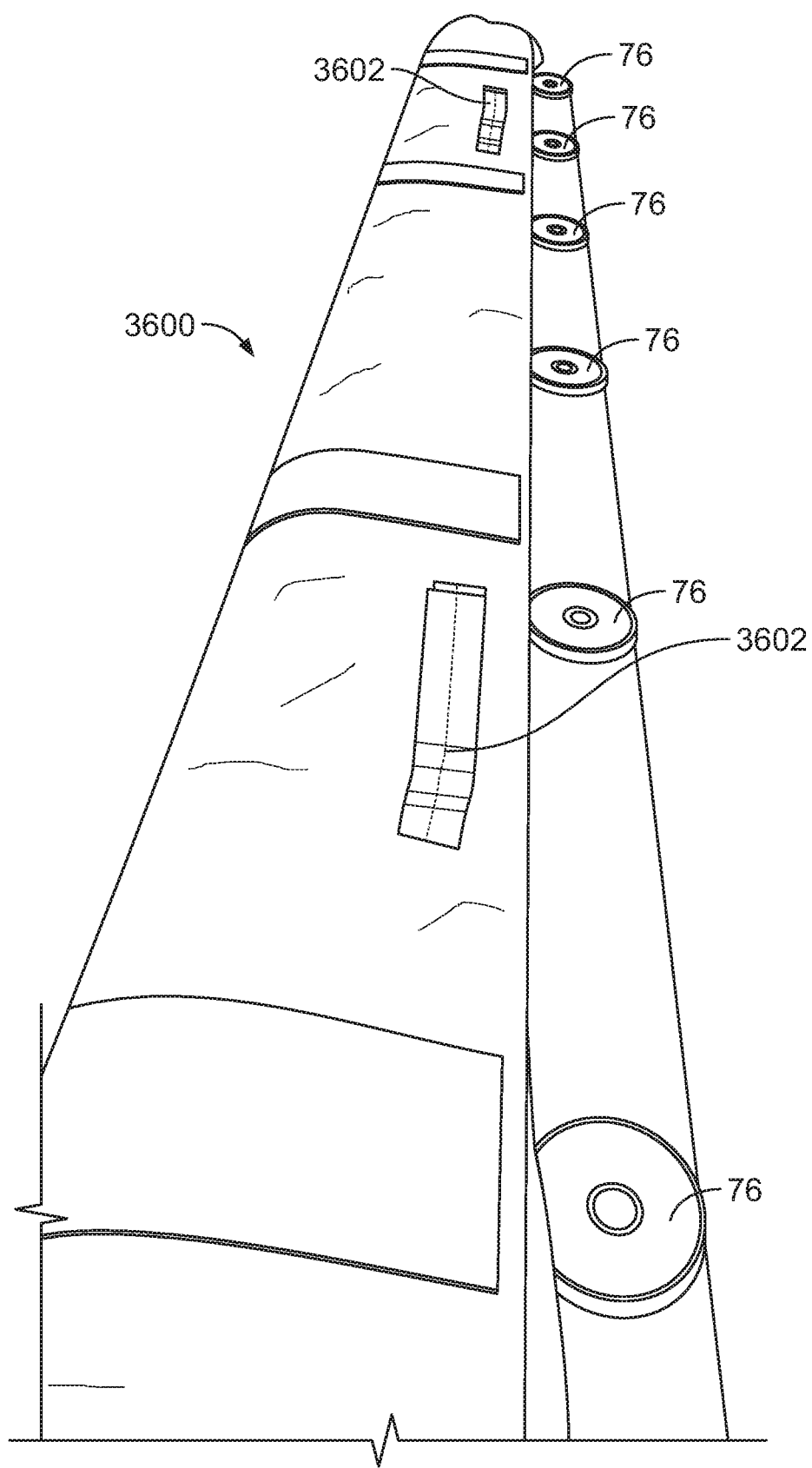
FIG. 36 is a perspective view of another example rear seal disclosed herein.

FIG. 36 illustrate an example rear seal 3600 disclosed herein. The rear seal 3600 includes handles 3602 to facilitate positioning and/or handling of the rear seal during installation and/or servicing.

Figure 37:
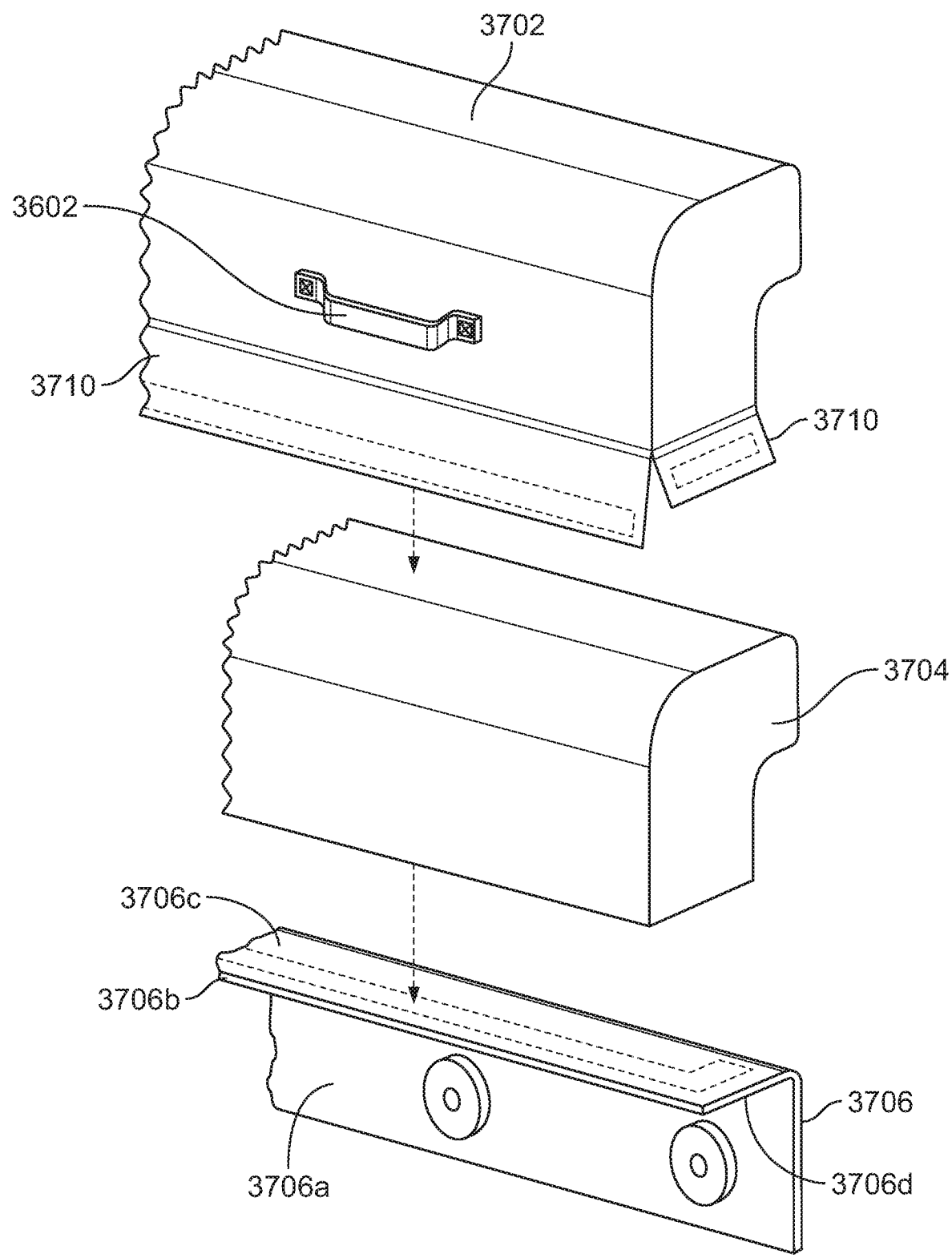
FIG. 37 is an exploded view of the example rear seal of FIG. 36.

FIG. 37 is an exploded view of the example rear seal 3600 of FIG. 36. The rear seal 3600 includes a cover 3702 (e.g., a fabric), a compressible wedge 3704 and a mounting bracket 3706. The cover 3702 is a flexible material that encompasses the compressible wedge 3704. The compressible wedge 3704 is an elongated compressible foam wedge. However, the compressible wedge 3704 can be any other compressible material(s). The compressible wedge 3704 couples to the mounting bracket 3706. For example, the mounting bracket 3706 is an L-bracket having a first leg 3706a and a second leg 3706b. The compressible wedge 3704 couples to or engages a first surface 3706c of the second leg 3706b of the mounting bracket 3706. The first leg 3706a of the mounting bracket 3706 includes disc magnets 76 to releasably secure the rear seal 3600 to a loading dock.

To protect the compressible wedge 3704 from damage or wear, the cover 3702 covers or encases at least a portion of the compressible wedge 3704 and/or the mounting bracket 3706. To cover the compressible wedge 3704, the cover 3702 forms a cavity to receive the compressible wedge 3704. The cover 3702 also attaches to the mounting bracket 3706. For example, the cover 3702 includes one or more flaps 3710 that couple to the mounting bracket 3706. For example, the flaps 3710 couple to a second surface 3706d of the second leg 3706b of the mounting bracket 3706 opposite the first surface 3706c. The flaps 3710 and the second surface 3706d include fasteners 3712 to couple the cover 3702 to the mounting bracket 3706. The fasteners 3712 of the illustrated example are hook-and-loop fasteners. However, in some examples, the fasteners 3712 can be adhesive, tape, and/or any other type of fastener(s).

Figure 38:
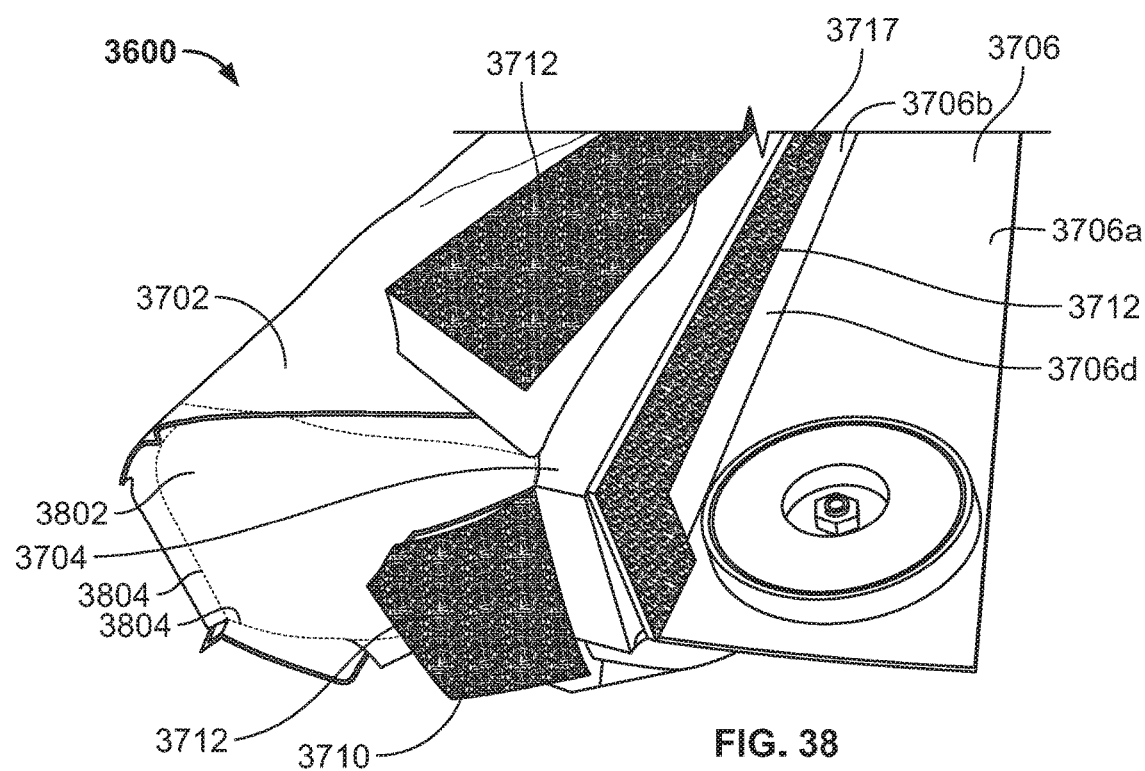
FIG. 38 is a perspective, partially assembled view of the example rear seal of FIGS. 36-37.
Figure 39:
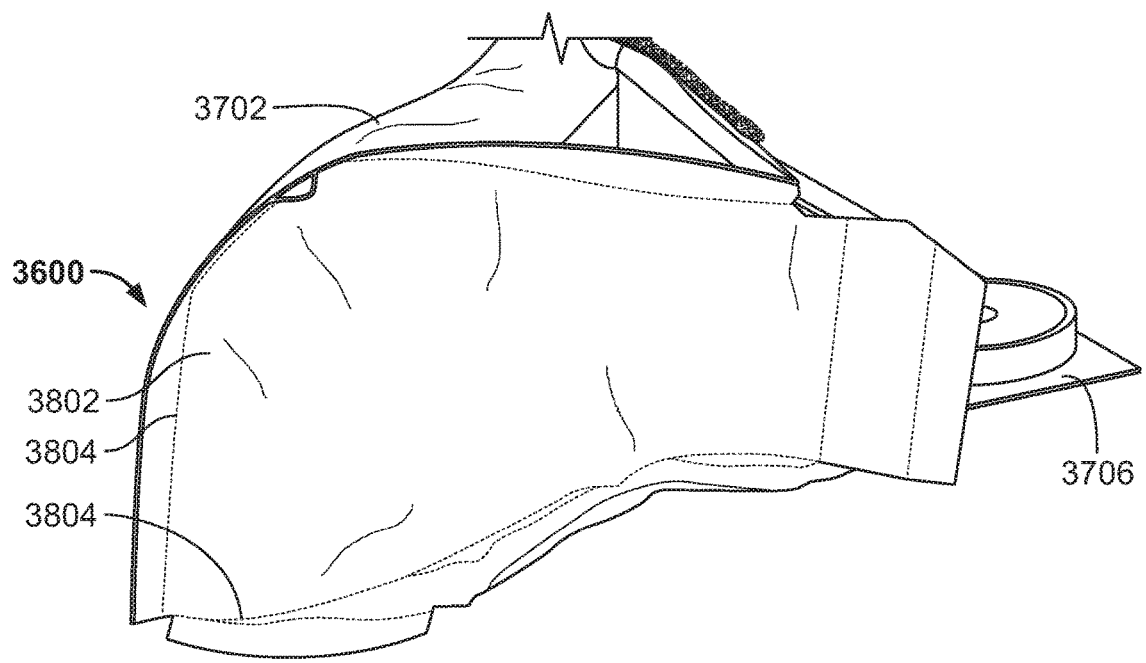
FIG. 39 is another perspective, partially assembled view of the example rear seal of FIGS. 36-38.
Figure 42A:
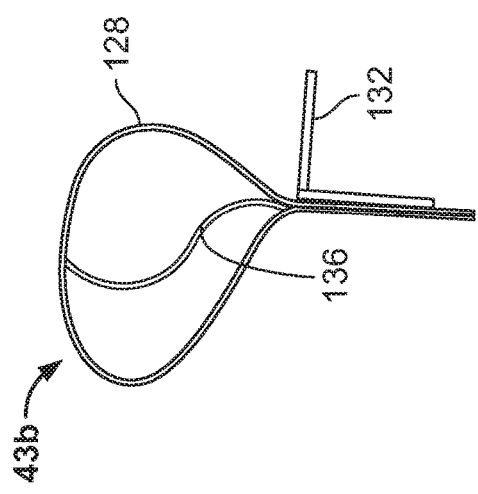
FIGS. 42a-42d are cross-sectional views of example rear seals disclosed herein that can be used to implement example seal apparatus disclosed herein.
Figure 42B:
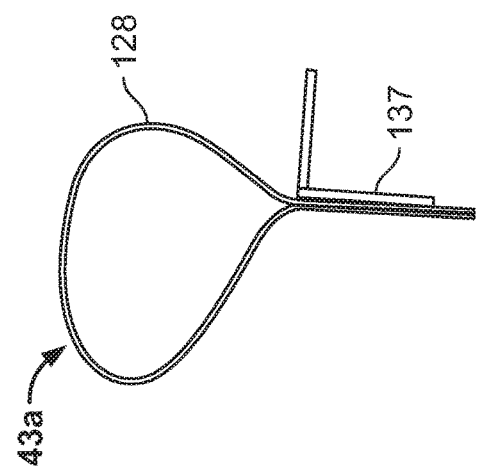
Figure 42C:
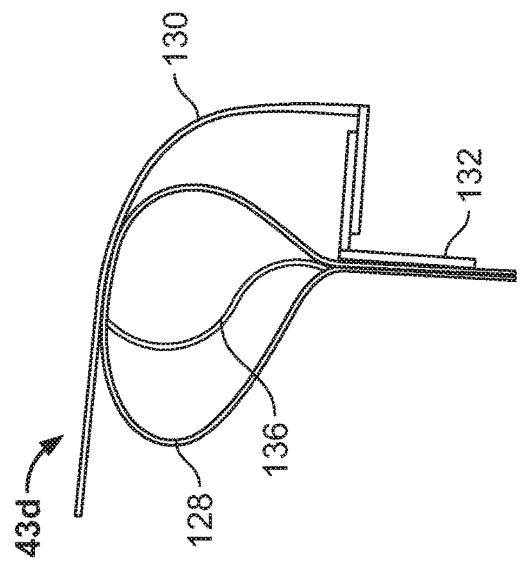
Figure 42D:
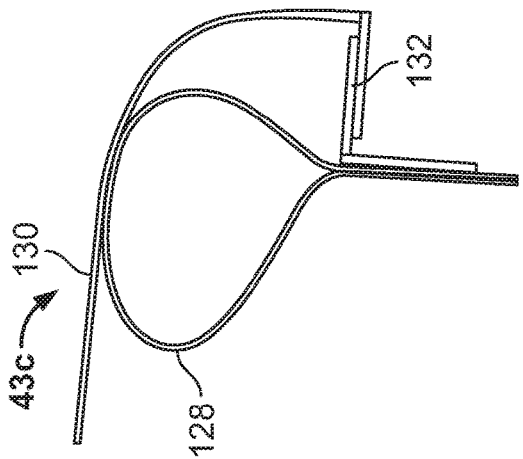

Referring to FIGS. 38 and 39, the cover 3702 can include end caps 3802 that are attached (e.g., adhered or sewn) to the cover 3702. For example, the end caps 3802 can be sewn to the cover 3702 via one or more stitches 3804, adhesive and/or any other fastener(s). This configuration can facilitate assembly of the cover 3702 and the compressible wedge 3704.

FIGS. 40A and 40B show other examples front seals 14b and 14c disclosed herein. The front seal 14b includes an axle 80, an outer tube 82, and a plurality of flexible flaps 118 extending radially outward relative to a longitudinal axis 88 of the front seal 14b. In some examples, the flexible flaps 118 are folded-over loops of flexible vinyl material. The flexible flaps 118 are sufficiently flexible and resilient to sealingly conform to a rear edge 66 of a vehicle 20, a lip face 120 of lip 16, and/or the forward facing surface of a rear seal (e.g., the rear seal 26, 1726, 3026, 3600). The front seal 14c includes an axle 80, an outer tube 82, a compressible core 122 (e.g., a resiliently compressible foam cylinder), an outer covering 124 (e.g., a flexible outer covering, a fabric, a vinyl sheet, etc.), and a plurality of flexible flaps 126 extending radially outward relative to a longitudinal axis 88. In some examples, the flexible flaps 126 are folded-over loops of flexible vinyl material. The flexible flaps 126 are sufficiently flexible and resilient to sealingly conform to a rear edge 66 of a vehicle 20, a lip face 120 of lip 16, and/or the forward facing surface of a rear seal (e.g., the rear seal 26, 1726, 3026, 3600).

FIGS. 41a-41e show various example rear seals 26a-26e that can implement the loading docks and/or the rear seals disclosed herein. The rear seal 26a includes resiliently compressible foam core 70a encased within flexible protective cover 72a. A fastener 74 couples a rear seal 26a to dock face 40 or to some other stationary surface of a dock leveler (e.g., the dock leveler 10).

Rear seals 26b-e are structurally similar to rear seal 26a but with various distinctive shapes that can provide different sealing characteristics. For example, rear seal 26a has a sharper front edge 4102 to engage a back surface 133 of the lip 16. The rear seal 26b has a higher or taller profile. The rear seal 26c eliminates some concave surfaces to avoid hollow areas between a foam core 70c and the cover 72c. The rear seal 26d is similar to rear seal 26c but has a sharper front edge 4104. Rear seal 26e has a generally sharp front edge 4106 for sealing and a blunter rear edge 4108 for structural support. In some examples, each of the covers 72a-e can include end caps (e.g., the end caps 3802) which are adhered (e.g., sewn) to edges of contact surfaces of the respective covers 72a-e. In some examples, each of the rear seals 26a-26e can have handles (e.g., handles 3602) for ease of installation and/or maneuvering and can be positioned in pit depths of 10 inches, 12 inches, 15 inches, etc.

FIGS. 42A-D illustrate various example rear seals 42a-43d that can implement the loading docks and/or the rear seals disclosed herein. The rear seal 42a includes a compressible core 128 and a rear seal mounting bracket 132. The rear seal 42b includes a compressible core 128, a reinforcement seal 136 and a rear seal mounting bracket 132. The rear seal 42c includes a compressible core 128, a cover 130 and a rear seal mounting bracket 132. The rear seal 42d includes a compressible core 128, a cover 130, a rear seal mounting bracket 132, and a reinforcement seal 136.

Although each example seal apparatus 21, 1102, 1402, 1702, 3002, the rear seal 3600, the front seals 40a-b, the rear seals 41a-e, and the rear seals 42a-d disclosed above has certain features (e.g., sensors), it should be understood that it is not necessary for a particular feature of one example seal apparatus 21, 1102, 1402, 1702, 3002, the rear seal 3600, the front seals 40a-b, the rear seals 41a-e, and the rear seals 42a-d to be used exclusively with that example. Instead, any of the features of the example seal apparatus 21, 1102, 1402, 1702, 3002, the rear seal 3600, the front seals 40a-b, the rear seals 41a-e, and the rear seals 42a-d described above and/or depicted in the drawings can be combined or implemented with any of the example seal apparatus 21, 1102, 1402, 1702, 3002, the rear seal 3600, the front seals 40a-b, the rear seals 41a-e, and the rear seals 42a-d, in addition to or in substitution for any of the other features of those examples. One example's features are not mutually exclusive to another example's features. Instead, the scope of this disclosure encompasses any combination of any of the features. In some examples, a restraint system disclosed in accordance with the teachings of this disclosure may have a combination of the features of the example seal apparatus 21, 1102, 1402, 1702, 3002, the rear seal 3600, the front seals 40a-b, the rear seals 41a-e, and the rear seals 42a-d disclosed herein.

From the foregoing, it will be appreciated that example methods, apparatus and articles of manufacture have been disclosed that provide one or more benefits including improved sealing between a front edge of a dock leveler pit and a rear edge of a vehicle, regardless of a position of a lip of a dock leveler. The example methods, apparatus and articles of manufacture further provide a vehicle-impactable front seal, a sealing system that provides clear open access to a pit area of a dock leveler, and a sealing system that can be used on a vertical storing deck, pit-style dock levelers and/or any other loading docks. In some examples, seal apparatus disclosed herein seal a gap between an outer surface of the lip and a rear edge of a vehicle during a loading and/or unloading operation (e.g., during an end-load or below dock end-load loading/unloading operation). In some examples, seal apparatus disclosed herein seal a hinge gap of between a lip and a deck of a dock leveler during a loading or unloading operation or when the deck and the lip are positioned in a stored position (e.g., a pit-style leveler is in a stored position in which the deck is generally horizontal relative to the pit area and the lip is generally vertical relative to the deck).

At least some of the aforementioned examples include one or more features and/or benefits including, but not limited to, the following:

In some examples, a loading dock includes a dock leveler movable between a standard loading position, a cross-traffic position and a below-deck loading position. The dock leveler has deck and lip movably coupled to the deck; and a seal assembly coupled to the loading dock adjacent a forward edge of the dock leveler. The seal assembly is to sealingly engage a front surface of a lip of the dock leveler and a rear surface of the lip when the dock leveler is positioned in a cross-traffic position or a below-dock position.

In some examples, the seal assembly has a front seal and a rear seal, the front seal being movable coupled relative to the rear seal to allow the lip of the dock leveler to be positioned between the front seal and the rear seal when the dock leveler is in at least one of the cross-traffic position or the below-dock position In some examples, the front seal includes a cover and an axle, the axle to enable the front seal to rotate about a longitudinal axis of the front seal In some examples, the front seal includes a compressible core, the compressible core having an aperture to receive the axle In some examples, a chord couples the front seal to the loading dock In some examples, a retainer is coupled to an end of the axle. The retainer has an aperture to receive the chord. A first end of the chord is attached to the retainer and the retainer retains the first end of the chord within the axle of the front seal.

In some examples, an anchor is mounted to the loading dock. The anchor has one or more apertures to receive a second end of the chord to couple the front seal to the loading dock.

In some examples, the rear seal includes a cover, a compressible core, and a rear seal mounting bracket to couple the rear seal to the loading dock.

In some examples, the rear seal mounting bracket includes a magnetic fastener to couple the rear seal to a mounting surface of the loading dock.

In some examples, the core includes a compressible foam body and the cover to encase the compressible foam body and at least a portion of the rear seal mounting bracket.

In some examples, the compressible core includes a bulb seal, the cover having a first portion to project from the bulb seal in a direction away from a dock face of the loading dock.

In some examples, the bulb seal includes a reinforcement seal positioned in a cavity of the bulb seal.

In some examples, a loading dock includes a deck movable between a raised position, a cross-traffic position, and a lowered position. A lip is pivotally coupled to the deck and movable between an extended position and a retracted position. The lip defines a lip face and a backside. A front seal is coupled to the loading dock. The front seal is configured to be positionable between the lip face of the lip and a rear edge of a vehicle to sealingly engage the lip face when the lip is in the retracted position and the deck is in at least one of the cross-traffic position or the lowered position.

In some examples, the front seal includes an axle to enable the front seal to rotate about a longitudinal axis of the front seal.

In some examples, the front seal includes a plurality of flexible flaps extending radially outward relative to the longitudinal axis.

In some examples, the front seal includes an axle and an outer tube, the outer tube to rotatable about the axle.

In some examples, the front seal includes a resiliently compressible foam member encased within a flexible covering.

In some examples, a mounting system is to urge the front seal in a rearward direction toward a dock face of the loading dock.

In some examples, a seal apparatus for use at a loading dock includes a front seal to be movably coupled to a dock face of a load. The front seal to move relative to the dock face in at least one of a first direction away from the dock face and a second direction towards the dock face. A rear seal is coupled adjacent the front seal. The front seal and the rear seal to receive a lip of a dock leveler therebetween such that the rear seal engages a backside of the lip and the front seal engages a frontside of the lip.

In some examples, a mounting system to movably couple the front seal to the dock face, the mounting system having a chord to attach to an anchor of the loading dock.

In some examples, the anchor includes at least one of a front seal mounting bracket or a counterweight.

In some examples, the mounting system includes a bias element to urge the front seal toward the rear seal.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A seal apparatus for use at a loading dock, the loading dock including a deck movable between a raised position, a cross-traffic position, and a lowered position, and a lip pivotally coupled to the deck and movable between an extended position and a retracted position, the lip defining a lip face and a backside opposite the lip face, the seal apparatus comprising:
a front seal;
a cable having a fixed length, the cable to suspend the front seal at the loading dock, the front seal to move, via the cable, relative to a dock face in at least one of a first direction away from the dock face or a second direction towards the dock face, the front seal structured to be positionable between the lip face of the lip and a rear edge of a vehicle to sealingly engage the lip face when the lip is in the retracted position and the deck is in at least one of the cross-traffic position or the lowered position, the front seal structured to enable operation of at least one of the deck or the lip when the front seal is suspended at the loading dock; and
a mounting system to moveably couple the front seal to the dock face, the mounting system to move the front seal relative to the dock face, the mounting system to enable the cable to maintain a fixed length when the front seal moves relative to the dock face.

2. The seal apparatus of claim 1, wherein the front seal includes an axle to enable the front seal to rotate about a longitudinal axis of the front seal.

3. The seal apparatus of claim 2, wherein the front seal includes a plurality of flexible flaps extending radially outward relative to the longitudinal axis.

4. The seal apparatus of claim 1, wherein the front seal includes a resiliently compressible foam member encased within a flexible covering.

5. The seal apparatus of claim 1, further including a rear seal coupled adjacent the front seal, the front seal and the rear seal to receive the lip of the deck therebetween such that the rear seal engages the backside of the lip and the front seal engages the lip face of the lip when the lip is in the retracted position.

6. The seal apparatus of claim 1, wherein the mounting system includes at least one of a weight or a bracket to urge the front seal in a rearward direction toward the dock face of the loading dock and enable movement of the front seal in at least one of a forward direction away from the dock face of the loading dock or a lateral direction along the dock face of the loading dock when the seal apparatus is installed at the loading dock.

7. The seal apparatus of claim 6, wherein the mounting system enables movement of the front seal relative to the dock face in the rearward direction and the forward direction independent from a tension in the cable.

8. A seal apparatus for use at a loading dock, the seal apparatus comprising:
a front seal structured to extend between lateral edges of a dock leveler of a loading dock, the front seal including:
a first cover defining a plurality of flaps and a first cavity;
an axle positioned in the first cavity to enable the front seal to rotate about a longitudinal axis of the front seal;
a cable to couple the front seal to the loading dock; and
a biasing element to couple to the cable, the biasing element to provide tension to the cable to position the front seal relative to the lateral edges of the dock leveler, the biasing element to bias the front seal in a rearward direction toward a dock face of the loading dock and enable the front seal to move in a forward direction away from the dock face of the loading dock when the seal apparatus is installed at the loading dock, the biasing element to enable the cable to maintain a fixed length when the front seal moves in the rearward and forward directions relative to the dock face.

9. The seal apparatus of claim 8, wherein the biasing element is positioned within a second cavity of the axle.

10. The seal apparatus of claim 8, wherein the front seal includes a compressible core, the compressible core having an aperture to at least one of define the first cavity or receive the axle.

11. The seal apparatus of claim 8, further including a retainer coupled to an end of the axle, the retainer having an aperture to receive the cable, the retainer to retain at least a portion of the cable within the axle of the front seal.

12. The seal apparatus of claim 8, further including an anchor mounted to the loading dock, the anchor having one or more apertures to receive an end of the cable to couple the front seal to the loading dock.

13. The seal apparatus of claim 8, further including a rear seal positioned adjacent the front seal, the rear seal including a compressible core and a rear seal mounting bracket to couple the compressible core to the loading dock, the front seal to move relative to the rear seal to allow a lip of the dock leveler to be positioned between the front seal and the rear seal when the dock leveler is in at least one of a cross-traffic position or a below-deck loading position.

14. The seal apparatus of claim 13, wherein the rear seal mounting bracket includes a magnetic fastener to couple the rear seal to a mounting surface of the loading dock.

15. The seal apparatus of claim 13, wherein the compressible core includes a compressible foam body and a second cover to encase the compressible foam body.

16. The seal apparatus of claim 13, wherein the compressible core includes a bulb seal and a second cover, the second cover having a first portion to project from the bulb seal in a direction away from a dock face of the loading dock.

17. The seal apparatus of claim 16, wherein the bulb seal includes a reinforcement seal positioned in a cavity of the bulb seal.

18. A seal apparatus for use at a loading dock comprising:
a front seal; and
a mounting system to movably couple the front seal to a dock face of a loading dock, the mounting system to urge the front seal in a rearward direction toward the dock face of the loading dock and enable movement of the front seal in a forward direction away from the dock face of the loading dock when the seal apparatus is installed at the loading dock, the mounting system including:

a first anchor structured to couple to a first side of the loading dock;

a second anchor structured to couple to a second side of the loading dock;

a first cable having a fixed length, the first cable having a first end to couple to the front seal and a second end opposite the first end to couple to the first anchor; and a second cable having a fixed length, the second cable having a third end to couple to the front seal and a fourth end opposite the third end to couple to the second anchor, the first cable and the second cable to suspend the front seal between a first lateral edge and a second lateral edge of a dock leveler via the first anchor and the second anchor when the seal apparatus is installed at a loading dock, the mounting system to enable each of the first cable and the second cable to maintain the fixed length when the front seal moves in the at least one of the rearward direction or the forward direction.

19. The seal apparatus of claim 18, wherein the mounting system includes a biasing element positioned within a cavity of the front seal, the first end of the first cable being coupled to a first end of the biasing element and the third end of the second cable being coupled to a second end of the biasing element opposite the first end of the biasing element.

20. The seal apparatus of claim 18, wherein the first anchor includes a first mounting bracket having a plurality of first openings to receive the second end of the first cable, the second end of the first cable being woven within one or more of the first openings when the first cable is coupled to the first anchor.

21. The seal apparatus of claim 18, wherein the second anchor includes a second mounting bracket having a plurality of second openings to receive the fourth end of the second cable, the fourth end of the second cable being woven within one or more of the second openings when the second cable is coupled to the second anchor.

22. The seal apparatus of claim 18, further including a rear seal to couple adjacent the front seal when installed at the loading dock, the front seal and the rear seal to receive a lip of a dock leveler therebetween such that the rear seal engages a backside of the lip and the front seal engages a frontside of the lip when the lip is in a retracted position.

* * * * *